US011582783B2

(12) United States Patent
Xue et al.

(10) Patent No.: US 11,582,783 B2
(45) Date of Patent: Feb. 14, 2023

(54) RESOURCE MAPPING METHOD, NETWORK DEVICE, AND TERMINAL DEVICE

(71) Applicant: HUAWEI TECHNOLOGIES CO., LTD., Guangdong (CN)

(72) Inventors: Lixia Xue, Beijing (CN); Zheng Chen, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 45 days.

(21) Appl. No.: 16/601,208

(22) Filed: Oct. 14, 2019

(65) Prior Publication Data
US 2020/0045728 A1 Feb. 6, 2020

Related U.S. Application Data

(63) Continuation of application No. PCT/CN2018/084336, filed on Apr. 25, 2018.

(30) Foreign Application Priority Data

May 4, 2017 (CN) .......................... 201710309848.6

(51) Int. Cl.
*H04W 4/00* (2018.01)
*H04W 72/12* (2023.01)
(Continued)

(52) U.S. Cl.
CPC ..... *H04W 72/1289* (2013.01); *H04W 72/042* (2013.01); *H04W 72/0453* (2013.01)

(58) Field of Classification Search
CPC ........ H04J 3/067; H04J 3/0682; H04J 3/0667; H04J 3/0697; H04J 3/0664; H04W 56/00;
(Continued)

(56) References Cited

U.S. PATENT DOCUMENTS

2008/0095133 A1* 4/2008 Kodo ................ H04W 72/1278
370/342
2010/0167772 A1* 7/2010 Fukui .................... H04L 5/0053
455/509
(Continued)

FOREIGN PATENT DOCUMENTS

CN 102946640 A 2/2013
CN 103298117 A 9/2013
(Continued)

OTHER PUBLICATIONS

Huawei et al., "Dynamic resource multiplexing of downlink control and data",3GPP Draft; R1-1700397, XP051207934, Jan. 16-20, 2017, 4 pages.
(Continued)

*Primary Examiner* — Atique Ahmed
(74) *Attorney, Agent, or Firm* — Fish & Richardson P.C.

(57) ABSTRACT

This application provides a resource mapping method, a network device, and a terminal device. The method includes: generating, by a network device, control information, where the control information is used to indicate at least one type of the following information: at least one bandwidth region in which at least one frequency domain resource unit is located, a granularity of the frequency domain resource unit, and a location of the frequency domain resource unit in the bandwidth region; and sending, by the network device, the control information to a terminal device. The frequency domain resource unit is a scheduling unit of a frequency domain resource used when the network device and the terminal device transmit a data channel. The granularity of the resource unit corresponds to a granularity of a resource unit used when the network device and the terminal device transmit a control channel.

18 Claims, 14 Drawing Sheets

(51) Int. Cl.
*H04W 72/04* (2023.01)
*H04W 72/0453* (2023.01)

(58) Field of Classification Search
CPC . H04W 56/001; H04W 72/042; H04W 76/27; H04W 72/0446; H04L 5/0053; H04L 1/1812
See application file for complete search history.

(56) References Cited

U.S. PATENT DOCUMENTS

| | | | |
|---|---|---|---|
| 2012/0236735 A1* | 9/2012 | Nory | H04W 52/367 370/252 |
| 2013/0039188 A1* | 2/2013 | Larsson | H04L 1/0039 370/329 |
| 2013/0039284 A1* | 2/2013 | Marinier | H04L 5/001 370/329 |
| 2013/0083753 A1* | 4/2013 | Lee | H04W 74/0833 370/329 |
| 2014/0146720 A1 | 5/2014 | Tang et al. | |
| 2014/0169328 A1* | 6/2014 | Ahimezawa | H04W 72/042 370/330 |
| 2015/0304993 A1* | 10/2015 | Shimezawa | H04L 5/001 370/329 |
| 2016/0226649 A1* | 8/2016 | Papasakellariou | H04L 5/006 |
| 2016/0338052 A1 | 11/2016 | Ji et al. | |
| 2017/0135105 A1 | 5/2017 | Li et al. | |
| 2018/0227922 A1* | 8/2018 | Lee | H04W 28/22 |
| 2019/0028313 A1 | 1/2019 | Takeda et al. | |
| 2019/0037540 A1* | 1/2019 | Seo | H04W 72/1273 |
| 2019/0223191 A1* | 7/2019 | Kim | H04L 5/0094 |
| 2019/0230647 A1* | 7/2019 | Yang | H04L 5/0051 |
| 2019/0320450 A1 | 10/2019 | Li et al. | |

FOREIGN PATENT DOCUMENTS

| | | |
|---|---|---|
| CN | 104938014 A | 9/2015 |
| CN | 105099634 A | 11/2015 |
| CN | 105338641 A | 2/2016 |
| CN | 105979597 A | 9/2016 |
| WO | 2014113138 A1 | 7/2014 |
| WO | 2017022425 A1 | 2/2017 |

OTHER PUBLICATIONS

Extended European Search Report issued in European Application No. 18795023.3 dated Feb. 13, 2020, 9 pages.
Office Action issued in Chinese Application No. 201710309848.6 dated Sep. 2, 2020, 39 pages (With English Translation).
3GPP TS 36.213 V13.1.1(Mar. 2016), 3rd Generation Partnership Project, Technical Specification Group Radio Access Network, Evolved Universal Terrestrial Radio Access (E-UTRA), Physical layer procedures(Release 13), Mar. 2016, 361 pages.
3GPP TS 36.211 V8.3.0 (May 2008),3rd Generation Partnership Project, Technical Specification Group Radio Access Network, Evolved Universal Terrestrial Radio Access (E-UTRA), Physical Channels and Modulation(Release 8), May 2008, 77 pages.
PCT International Search Report and Written Opinion in International Application No. PCT/CN2018/084,336, dated Jul. 30, 2018, 18 pages (With English Translation).
Office Action issued in Chinese Application No. 201710309848.6 dated Mar. 3, 2020, 61 (With English Translation).
Huawei, HiSilicon, "Discussion on PRB sharing between NR-PDCCH and eMBB data," 3GPP TSG RAN WG1 RAN1 #88 Meeting, R1-1703334, Athens, Greece, Feb. 13-17, 2017, 10 pages.
EPO Communication pursuant to Article 94(3) EPC issued in European Application No. 18795023.3 dated Mar. 12, 2021, 10 pages.

* cited by examiner

First resource
mapping mode set

Second resource
mapping mode set

RESOURCE MAPPING METHOD, NETWORK DEVICE, AND TERMINAL DEVICE

CROSS-REFERENCE TO RELATED APPLICATIONS

This application is a continuation of International Application No. PCT/CN2018/084336, filed on Apr. 25, 2018, which claims priority to Chinese Patent Application No. 201710309848.6, filed on May 4, 2017. The disclosures of the aforementioned applications are hereby incorporated by reference in their entireties.

TECHNICAL FIELD

This application relates to communications technologies, and in particular, to a resource mapping method, a network device, and a terminal device.

BACKGROUND

In a new radio (NR) standard of a fifth-generation communications system, a downlink transmission resource is divided into a control region and a data region. The control region is used to transmit a control channel, and the data region is used to transmit a data channel. Downlink control information carried on the control channel is used to indicate a frequency domain location, in the data region, of a resource block (RB) used by the data channel, and the data channel is used to carry downlink data.

In the NR standard, the control channel may use one or more control channel elements (CCE) for transmission. One CCE includes a plurality of resource element groups (REG). Therefore, when sending the control channel, a base station needs to perform CCE-to-REG resource mapping on the control channel in the control region of the downlink transmission resource. To be specific, the REG is used as a basic unit of the CCE, and each CCE used by the control channel is mapped to the downlink transmission resource. When resource mapping is performed in this manner, resources that are not occupied by the control channel and that are in the control region of the downlink transmission resource are idle resources in the control region.

Currently, it is proposed in the NR standard that when there are the idle resources in the control region, the data channel may reuse the idle resources for data transmission, to improve resource utilization. Therefore, when the data channel uses resources in the control region, how the base station allocates resources to the data channel to improve resource utilization of the control region is an urgent problem that needs to be resolved.

SUMMARY

This application provides a resource mapping method, a network device, and a terminal device to resolve a technical problem that a manner in which a base station allocates a resource to a data channel is required when the data channel is to use the resource in a control region.

According to a first aspect, this application provides a resource mapping method, where the method includes:

generating, by a network device, control information, where the control information is used to indicate at least one type of the following information: at least one bandwidth region in which at least one frequency domain resource unit is located, a granularity of the frequency domain resource unit, and a location of the frequency domain resource unit in the bandwidth region; the frequency domain resource unit is a scheduling unit of a frequency domain resource used when the network device and a terminal device transmit a data channel, the granularity of the resource unit is corresponding to a granularity of a resource unit used when the network device and the terminal device transmit a control channel, operating bandwidth of the terminal device includes a plurality of evenly spaced bandwidth regions, and the at least one bandwidth region is one or more of the plurality of bandwidth regions; and sending, by the network device, the control information to the terminal device.

In the resource mapping method provided in the first aspect, the system bandwidth is classified into a plurality of evenly spaced bandwidth regions, so that the network device schedules, using the frequency domain resource unit as a scheduling unit of the frequency domain resource, at least one frequency domain resource unit in at least one bandwidth region of the plurality of bandwidth regions as a frequency domain resource used when the network device and the terminal device transmit a data channel, and indicates scheduling information by using the control information. Because the at least one frequency domain resource unit may be located in a control region and a data region of a downlink transmission resource in time domain, in this manner, an idle resource in the control region may be reused by the data channel for data transmission, to improve resource utilization.

In a possible design, the method further includes:

determining, by the network device, a first resource mapping mode set, where the first resource mapping mode set includes at least one resource mapping mode, and the resource mapping mode includes the granularity of the frequency domain resource unit and a frequency domain location of the frequency domain resource unit in the bandwidth region, where the control information includes a first information field and/or a second information field, the first information field is used to indicate the at least one bandwidth region in which the at least one frequency domain resource unit is located, and the second information field is used to indicate the resource mapping mode.

In the resource mapping method provided in the possible design, different information fields of the control information are used to indicate different types of information, so that there are various manners in which the control information indicates the scheduling information.

In a possible design, each resource mapping mode in the at least one first resource mapping mode is corresponding to an identifier, and that the second information field is used to indicate the resource mapping mode includes:

the second information field includes an identifier corresponding to the resource mapping mode.

In the resource mapping method provided in the possible design, the resource mapping mode is indicated in a manner of adding the identifier to the second information field, thereby reducing signaling overheads.

In a possible design, after the determining, by the network device, a first resource mapping mode set, the method further includes:

sending, by the network device, indication information to the terminal device, where the indication information is used to indicate the first resource mapping mode set from a plurality of candidate resource mapping mode sets.

In the resource mapping method provided in the possible design, there are various indication manners.

In a possible design, the plurality of candidate resource mapping mode sets include the first resource mapping mode set and a second resource mapping mode set, and resource mapping modes in the first resource mapping mode set are not all the same as resource mapping modes in the second resource mapping mode set.

In a possible design, the indication information is carried in higher layer signaling.

In a possible design, the control information further includes a third information field, and the indication information is carried in the third information field.

In the resource mapping method provided in the possible design, there are various indication manners.

In a possible design, the first information field includes a bitmap, and the bitmap is used to indicate the at least one bandwidth region in which the at least one frequency domain resource unit is located; and each bit in the bitmap is corresponding to one bandwidth region.

In the resource mapping method provided in the possible design, the at least one bandwidth region in which the at least one frequency domain resource unit is located is indicated in a manner of adding the bitmap to the first information field, thereby reducing signaling overheads.

In a possible design, that the granularity of the resource unit is corresponding to the granularity of the resource unit used when the network device and the terminal device transmit the control channel includes:

the granularity of the resource unit is a granularity of a resource unit in at least one resource unit used when the control channel is transmitted.

In a possible design, the method further includes:

configuring, by the network device, a size of the at least one bandwidth region for the terminal device by using the higher layer signaling; or obtaining, by the network device, a predefined size of the at least one bandwidth region.

In a possible design, the first resource mapping mode set is a specific resource mapping mode configured by the network device for the terminal device, and a quantity of bits in the second information field is determined based on a quantity of first resource mapping modes in the first resource mapping mode set.

According to a second aspect, this application provides a resource mapping method, where the method includes:

receiving, by a terminal device, control information sent by a network device, where the control information is used to indicate at least one type of the following information: at least one bandwidth region in which at least one frequency domain resource unit is located, a granularity of the frequency domain resource unit, and a location of the frequency domain resource unit in the bandwidth region; the frequency domain resource unit is a scheduling unit of a frequency domain resource used when the terminal device and the network device transmit a data channel, the granularity of the resource unit is corresponding to a granularity of a resource unit used when the network device and the terminal device transmit a control channel, operating bandwidth of the terminal device includes a plurality of evenly spaced bandwidth regions, and the at least one bandwidth region is one or more of the plurality of bandwidth regions; and transmitting, by the terminal device, the data channel on the at least one frequency domain resource unit based on the control information.

In a possible design, the method further includes:

determining, by the terminal device, a first resource mapping mode set, where the first resource mapping mode set includes at least one resource mapping mode, and the resource mapping mode includes the granularity of the frequency domain resource unit and a frequency domain location of the frequency domain resource unit in the bandwidth region, where the control information includes a first information field and a second information field, the first information field is used to indicate the at least one bandwidth region in which the at least one frequency domain resource unit is located, and the second information field is used to indicate the resource mapping mode.

In a possible design, each resource mapping mode in the at least one first resource mapping mode is corresponding to an identifier, and that the second information field is used to indicate the resource mapping mode includes:

the second information field includes an identifier corresponding to the resource mapping mode.

In a possible design, before the determining, by the terminal device, a first resource mapping mode set, the method further includes:

receiving, by the terminal device, indication information sent by the network device, where the indication information is used to indicate the first resource mapping mode set from a plurality of candidate resource mapping mode sets.

In a possible design, the plurality of candidate resource mapping mode sets include the first resource mapping mode set and a second resource mapping mode set, and resource mapping modes in the first resource mapping mode set are not all the same as resource mapping modes in the second resource mapping mode set.

In a possible design, the indication information is carried in higher layer signaling.

In a possible design, the control information further includes a third information field, and the indication information is carried in the third information field.

In a possible design, the first information field includes a bitmap, and the bitmap is used to indicate the at least one bandwidth region in which the at least one frequency domain resource unit is located; and each bit in the bitmap is corresponding to one bandwidth region.

In a possible design, that the granularity of the resource unit is corresponding to the granularity of the resource unit used when the terminal device and the network device transmit the control channel includes:

the granularity of the resource unit is a granularity of a resource unit in at least one resource unit used when the control channel is transmitted.

In a possible design, the method further includes:

receiving, by the terminal device, higher layer signaling sent by the network device, where the higher layer signaling is used to configure a size of the at least one bandwidth region; or obtaining, by the terminal device, a predefined size of the at least one bandwidth region.

In a possible design, the first resource mapping mode set is a specific resource mapping mode configured by the network device for the terminal device, and a quantity of bits in the second information field is determined based on a quantity of first resource mapping modes in the first resource mapping mode set.

For beneficial effects of the resource mapping method provided in the second aspect and each possible design of the second aspect, refer to beneficial effects brought by the first aspect and each possible design of the first aspect. Details are not described herein again.

According to a third aspect, this application provides a network device, where the network device includes:

a generation module, configured to generate control information, where the control information is used to indicate at least one type of the following information: at least one bandwidth region in which at least one frequency domain resource unit is located, a granularity of the frequency domain resource unit, and a location of the frequency domain resource unit in the bandwidth region; the frequency domain resource unit is a scheduling unit of a frequency domain resource used when the network device and a terminal device transmit a data channel, the granularity of the resource unit is corresponding to a granularity of a resource unit used when the network device and the terminal device transmit a control channel, operating bandwidth of the terminal device includes a plurality of evenly spaced bandwidth regions, and the at least one bandwidth region is one or more of the plurality of bandwidth regions; and a sending module, configured to send the control information to the terminal device.

In a possible design, the network device further includes:

a determining module, configured to determine a first resource mapping mode set, where the first resource mapping mode set includes at least one resource mapping mode, and the resource mapping mode includes the granularity of the frequency domain resource unit and a frequency domain location of the frequency domain resource unit in the bandwidth region, where the control information includes a first information field and/or a second information field, the first information field is used to indicate the at least one bandwidth region in which the at least one frequency domain resource unit is located, and the second information field is used to indicate the resource mapping mode.

In a possible design, each resource mapping mode in the at least one first resource mapping mode is corresponding to an identifier, and that the second information field is used to indicate the resource mapping mode includes:

the second information field includes an identifier corresponding to the resource mapping mode.

In a possible design, the sending module is further configured to: after the determining module determines the first resource mapping mode set, send indication information to the terminal device, where the indication information is used to indicate the first resource mapping mode set from a plurality of candidate resource mapping mode sets.

In a possible design, the plurality of candidate resource mapping mode sets include the first resource mapping mode set and a second resource mapping mode set, and resource mapping modes in the first resource mapping mode set are not all the same as resource mapping modes in the second resource mapping mode set.

In a possible design, the indication information is carried in higher layer signaling.

In a possible design, the control information further includes a third information field, and the indication information is carried in the third information field.

In a possible design, the first information field includes a bitmap, and the bitmap is used to indicate the at least one bandwidth region in which the at least one frequency domain resource unit is located; and each bit in the bitmap is corresponding to one bandwidth region.

In a possible design, that the granularity of the resource unit is corresponding to the granularity of the resource unit used when the network device and the terminal device transmit the control channel includes:

the granularity of the resource unit is a granularity of a resource unit in at least one resource unit used when the control channel is transmitted.

In a possible design, the network device further includes:

a processing module, configured to: configure a size of the at least one bandwidth region for the terminal device by using the higher layer signaling; or obtain a predefined size of the at least one bandwidth region.

In a possible design, the first resource mapping mode set is a specific resource mapping mode configured by the network device for the terminal device, and a quantity of bits in the second information field is determined based on a quantity of first resource mapping modes in the first resource mapping mode set.

For beneficial effects of the network device provided in the third aspect and each possible design of the third aspect, refer to beneficial effects brought by the first aspect and each possible design of the first aspect. Details are not described herein again.

According to a fourth aspect, this application provides a terminal device, where the terminal device includes:

a receiving module, configured to receive control information sent by a network device, where the control information is used to indicate at least one type of the following information: at least one bandwidth region in which at least one frequency domain resource unit is located, a granularity of the frequency domain resource unit, and a location of the frequency domain resource unit in the bandwidth region; the frequency domain resource unit is a scheduling unit of a frequency domain resource used when the terminal device and the network device transmit a data channel, the granularity of the resource unit is corresponding to a granularity of a resource unit used when the network device and the terminal device transmit a control channel, operating bandwidth of the terminal device includes a plurality of evenly spaced bandwidth regions, and the at least one bandwidth region is one or more of the plurality of bandwidth regions; and a transmission module, configured to transmit the data channel on the at least one frequency domain resource unit based on the control information.

In a possible design, the terminal device further includes:

a determining module, configured to determine a first resource mapping mode set, where the first resource mapping mode set includes at least one resource mapping mode, and the resource mapping mode includes the granularity of the frequency domain resource unit and a frequency domain location of the frequency domain resource unit in the bandwidth region, where the control information includes a first information field and a second information field, the first information field is used to indicate the at least one bandwidth region in which the at least one frequency domain resource unit is located, and the second information field is used to indicate the resource mapping mode.

In a possible design, each resource mapping mode in the at least one first resource mapping mode is corresponding to an identifier, and that the second information field is used to indicate the resource mapping mode includes:

the second information field includes an identifier corresponding to the resource mapping anode.

In a possible design, the receiving module is further configured to: before the determining module determines the first resource mapping mode set, receive indication information sent by the network device, where the indication information is used to indicate the first resource mapping mode set from a plurality of candidate resource mapping mode sets.

In a possible design, the plurality of candidate resource mapping mode sets include the first resource mapping mode set and a second resource mapping mode set, and resource mapping modes in the first resource mapping mode set are not all the same as resource mapping modes in the second resource mapping mode set.

In a possible design, the indication information is carried in higher layer signaling.

In a possible design, the control information further includes a third information field, and the indication information is carried in the third information field.

In a possible design, the first information field includes a bitmap, and the bitmap is used to indicate the at least one bandwidth region in which the at least one frequency domain resource unit is located; and each bit in the bitmap is corresponding to one bandwidth region.

In a possible design, that the granularity of the resource unit is corresponding to the granularity of the resource unit used when the terminal device and the network device transmit the control channel includes:

the granularity of the resource unit is a granularity of a resource unit in at least one resource unit used when the control channel is transmitted.

In a possible design, the receiving module is further configured to receive higher layer signaling sent by the network device, where the higher layer signaling is used to configure a size of the at least one bandwidth region; or the terminal device further includes:

an obtaining module, configured to obtain a predefined size of the at least one bandwidth region.

In a possible design, the first resource mapping mode set is a specific resource mapping mode configured by the network device for the terminal device, and a quantity of bits in the second information field is determined based on a quantity of first resource mapping modes in the first resource mapping mode set.

For beneficial effects of the terminal device provided in the fourth aspect and each possible design of the fourth aspect, refer to beneficial effects brought by the second aspect and each possible design of the second aspect. Details are not described herein again.

According to a fifth aspect, this application provides a network device, including a processor, a memory, a receiver, and a transmitter, where both the receiver and the transmitter are coupled to the processor, the processor controls a receiving action of the receiver, and the processor controls a sending action of the transmitter; and the memory is configured to store computer-executable program code, where the program code includes an instruction; and when the processor executes the instruction, the network device performs the control channel sending method provided in the first aspect and each possible design of the first aspect.

For beneficial effects of the network device provided in the fifth aspect, refer to beneficial effects brought by the first aspect and each possible design of the first aspect. Details are not described herein again.

According to a sixth aspect, this application provides a terminal device, including a processor, a memory, a receiver, and a transmitter, where both the receiver and the transmitter are coupled to the processor, the processor controls a receiving action of the receiver, and the processor controls a sending action of the transmitter; and the memory is configured to store computer-executable program code, where the program code includes an instruction; and when the processor executes the instruction, the terminal device performs the control channel sending method provided in the second aspect and each possible design of the second aspect.

For beneficial effects of the terminal device provided in the sixth aspect, refer to beneficial effects brought by the second aspect and each possible design of the second aspect. Details are not described herein again.

According to a seventh aspect of this application, a network device is provided, and includes at least one processing element (or chip) configured to perform the method in the first aspect.

According to an eighth aspect of this application, a terminal device is provided, and includes at least one processing element (or chip) configured to perform the method in the second aspect.

According to a ninth aspect of this application, a program is provided, and the program is used to perform the method in the first aspect when being executed by a processor.

According to a tenth aspect of this application, a program is provided, and the program is used to perform the method in the second aspect when being executed by a processor.

According to an eleventh aspect of this application, a program product is provided, for example, a computer-readable storage medium, and includes the program in the ninth aspect.

According to a twelfth aspect of this application, a program product is provided, for example, a computer-readable storage medium, and includes the program in the tenth aspect.

According to a thirteenth aspect of this application, a computer-readable storage medium is provided, the computer-readable storage medium stores an instruction, and when the instruction runs on a computer, the computer performs the method in the first aspect.

According to a fourteenth aspect of this application, a computer-readable storage medium is provided, the computer-readable storage medium stores an instruction, and when the instruction runs on a computer, the computer performs the method in the second aspect.

According to the resource mapping method, the network device, and the terminal device provided in this application, the system bandwidth is classified into a plurality of evenly spaced bandwidth regions, so that the network device schedules, using the frequency domain resource unit as a scheduling unit of the frequency domain resource, at least one frequency domain resource unit in at least one bandwidth region of the plurality of bandwidth regions as a frequency domain resource used when the network device and the terminal device transmit a data channel, and indicates scheduling information by using the control information. Because the at least one frequency domain resource unit may be located in a control region and a data region of a downlink transmission resource in time domain, in this manner, an idle resource in the control region may be reused by the data channel for data transmission, to improve resource utilization.

DESCRIPTION OF EMBODIMENTS

"A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

It should be understood that although terms "first" and "second" may be used in this application to describe information fields, these information fields should not be limited by these terms. These terms are merely used to differentiate between the information fields. For example, without departing from the scope of the embodiments of this application, the first information field may be also referred to as the second information field, and similarly, the second information field may be also referred to as the first information field.

It should be understood that although terms "first" and "second" may be used in this application to describe resource mapping mode sets, these resource mapping mode sets should not be limited by these terms. These terms are merely used to differentiate between the resource mapping mode sets. For example, without departing from the scope of the embodiments of this application, a first resource mapping mode set may be also referred to as a second resource mapping mode set, and similarly, the second resource mapping mode set may be also referred to as the first resource mapping mode set.

Figure 1:
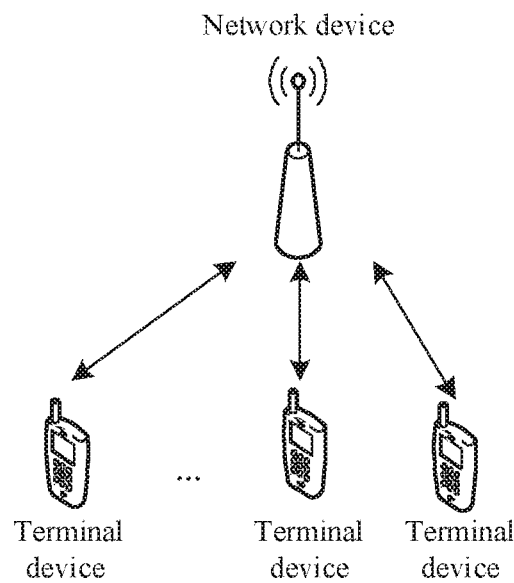
FIG. 1 is an architectural diagram of a communications system according to this application.

FIG. 1 is an architectural diagram of a communications system according to this application. A control channel sending method provided in this application is applicable to the communications system shown in FIG. 1. The communications system may be an LTE communications system or an NR communications system, or may be alternatively another future communications system. This is not limited herein. As shown in FIG. 1, the communications system includes a network device and a terminal device. The network device and the terminal device may communicate with each other by using one or more air interface technologies.

The network device may be a base station or an access point, or may be a device that is in an access network and that communicates with a wireless terminal through an air interface by using one or more sectors. The base station may be configured to perform two-way conversion on a received over-the-air frame and an IP packet and serve as a router between the wireless terminal and another part of the access network. The another part of the access network may include an Internet protocol (IP) network. The base station may further coordinate attribute management of the air interface. For example, the base station may be a base transceiver station (BTS) in global system for mobile communications (GSM) or code division multiple access (CDMA), a NodeB (NB) in wideband code division multiple access (WCDMA), an evolved NodeB (eNB or eNodeB) in long term evolution (LTE), a relay node or an access point, or a gNB in a future 5G network. This is not limited herein.

The terminal device may be the wireless terminal or a wired terminal. The wireless terminal may be a device that provides connectivity of voice and/or other service data for a user, a handheld device with a radio connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus. Wireless terminals exchange a language and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may be also referred to as a system, a subscriber unit, a subscriber station, a mobile station, a remote station, a remote terminal, an access terminal, a user terminal, a user agent, user equipment. This is not limited herein.

A 5G communications system is used as an example. In an NR standard of the 5G communications system, a downlink transmission resource is downlink system bandwidth $N_{RB}^{DL}$ in frequency domain, and includes several orthogonal frequency division multiplexing (OFDM) symbols (for example, 7 or 14 OFDM symbols) in time domain.

Figure 2:
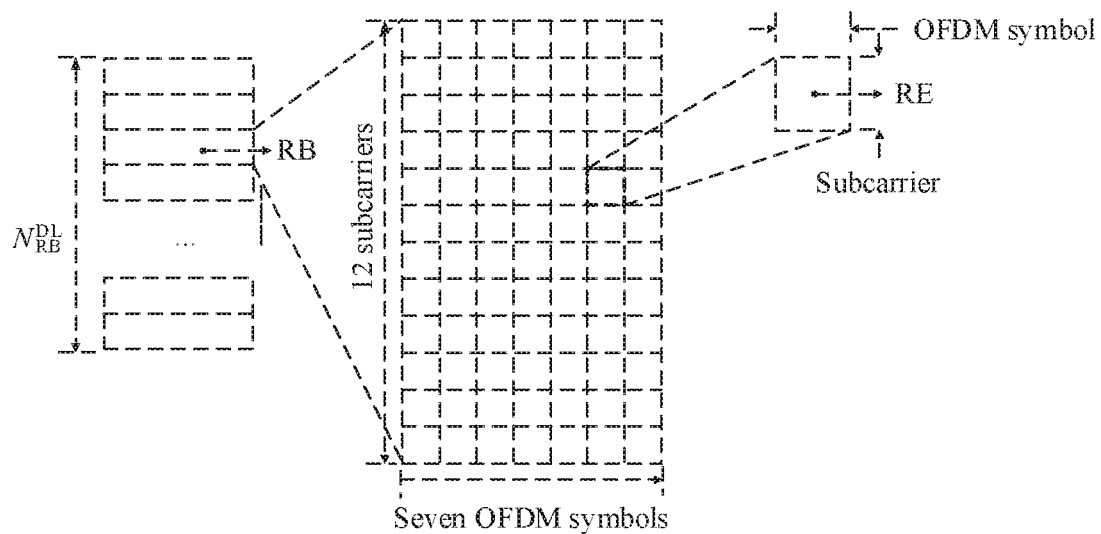
FIG. 2 is a schematic diagram of downlink system bandwidth.

FIG. 2 is a schematic diagram of downlink system bandwidth. As shown in FIG. 2, a basic unit of $N_{RB}^{DL}$ is a resource block (RB). Each RB includes 12 continuous subcarriers in frequency domain, and includes 6 or 7 OFDM symbols in time domain. Still referring to FIG. 2, in RB resource grids shown in FIG. 2, each grid is a resource element (RE), and each RE includes one subcarrier in an OFDM symbol.

Figure 3:
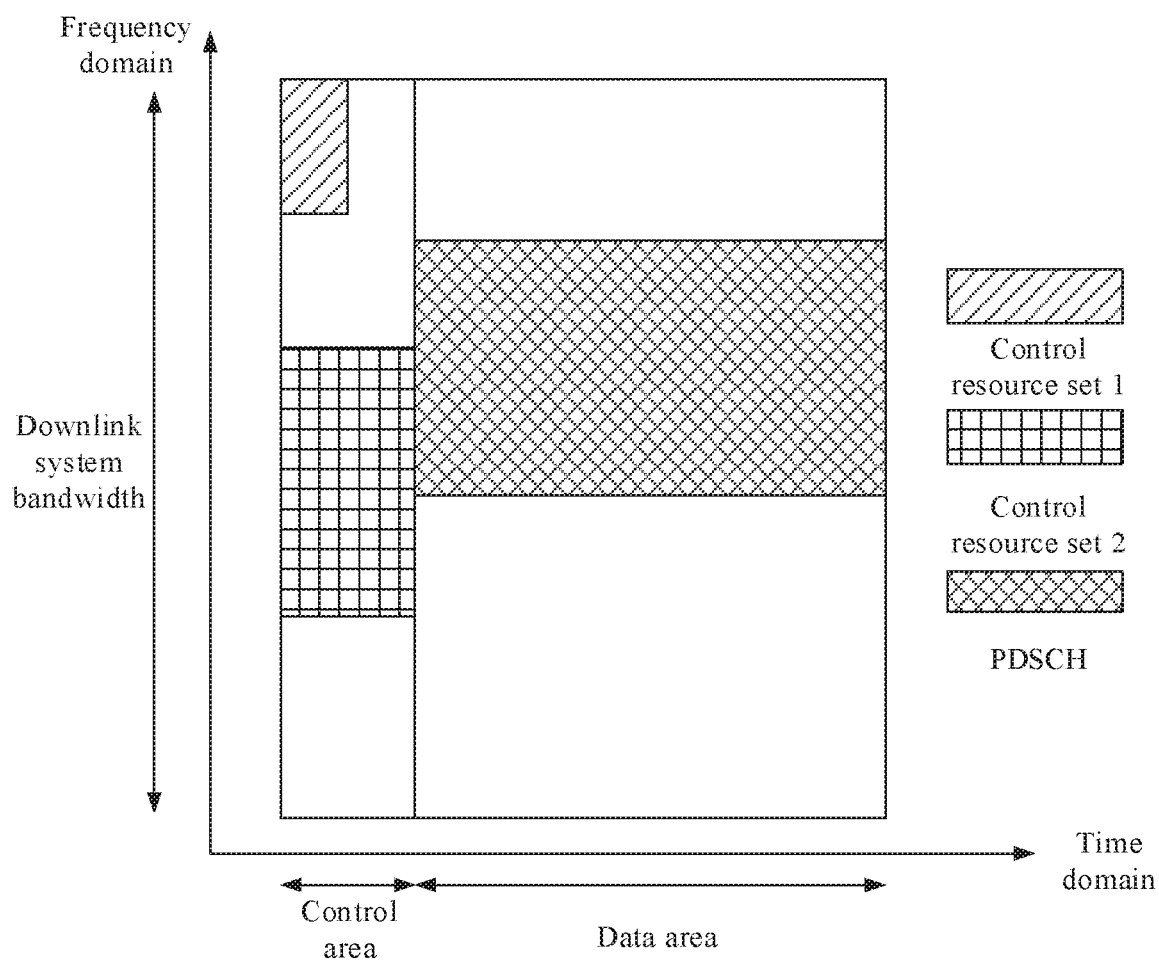
FIG. 3 is a schematic diagram of a downlink transmission resource.

FIG. 3 is a schematic diagram of a downlink transmission resource. As shown in FIG. 3, the downlink transmission resource is divided into a control region and a data region in time domain in this application. In other words, the control region and the data region each include entire downlink system bandwidth $N_{RB}^{DL}$ in frequency domain, and include a different time domain symbol in time domain. It should be noted that in all the following accompanying drawings, "time" is used to represent time domain, and "frequency" is used to represent frequency domain. This is not explained one by one again.

The control region is used to transmit a control channel, and the data region is used to transmit a data channel. Control information (namely, resource allocation information of the data channel) carried on the control channel can indicate a frequency domain location that is in the data region and that is of an RB used by the data channel, and the data channel is used to carry downlink data or uplink data. The control channel herein may be, for example, a physical downlink control channel (PDCCH), and the control information carried on the control channel may be, for example, downlink control information (DCI). The data channel herein may be, for example, a physical downlink shared channel (PDSCH).

To improve efficiency of blindly detecting the control channel by a terminal device, a concept of a control resource set is proposed in an NR standard. In other words, one or more control resource sets in the control region are obtained through division and allocated to each terminal device. The network device may send the control channel to the terminal device on any control resource set corresponding to the terminal device. As shown in FIG. 3, two control resource sets in the control region are obtained through division and allocated to the terminal device: a control resource set 1 and a control resource set 2 of downlink transmission resources. As shown in FIG. 3, the network device may send the control channel to the terminal device on the control resource set 1, or may alternatively send the control channel to the terminal device on the control resource set 2.

It should be noted that sending of the control channel may be understood as sending of the control information on the control channel. It may be alternatively understood that when the network device sends the control channel on the control resource set 1, the network device sends the control information on the control resource set 1.

Figure 4:
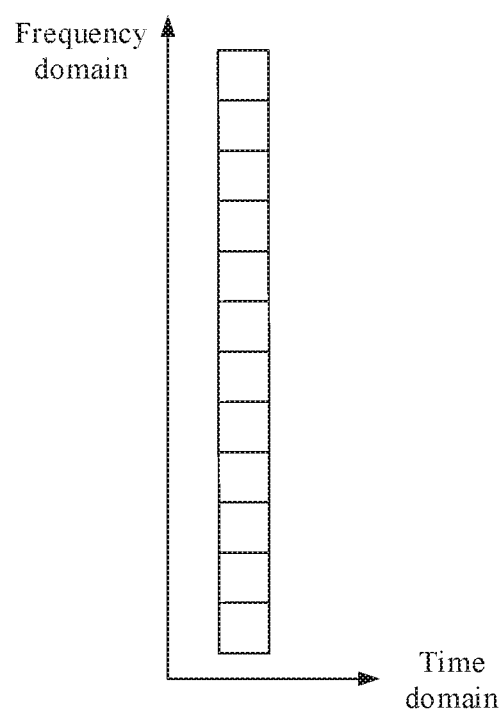
FIG. 4 is a schematic diagram of a REG.

In addition, in the NR standard, the control channel may be transmitted on the control resource set by using one or more CCEs. The plurality of CCEs herein may be, for example, 2, 4, or 8 CCEs, One CCE includes a plurality of REGs. For example, one CCE includes 4 REGs or 6 REGs. FIG. 4 is a schematic diagram of a REG As shown in FIG. 4, each REG includes 12 continuous subcarriers in frequency domain, and includes one orthogonal frequency division multiplexing (OFDM) symbol in time domain. In other words, each REG includes 12 continuous REs in frequency domain. In other words, bandwidth occupied by each REG in frequency domain is the same as bandwidth occupied by one RB.

When sending the control channel to the terminal device, the network device needs to perform CCE-to-REG resource mapping on the control channel on a control resource set corresponding to the terminal device. Currently, NR supports the following several CCE-to-REG resource mapping manners: a continuous (Localized) resource mapping manner, a distributed resource mapping manner, a frequency-first resource mapping manner, and a time-first resource mapping manner. When the CCE-to-REG resource mapping is performed by using the localized resource mapping manner, REGs belonging to a same CCE are continuously mapped in frequency domain of the downlink transmission resource. When the CCE-to-REG resource mapping is performed by using the distributed resource mapping manner, REGs belonging to a same CCE are discretely mapped in frequency domain of the downlink transmission resource. When the CCE-to-REG resource mapping is performed by using the frequency-first resource mapping manner, a mapping sequence for REGs belonging to a same CCE on the downlink transmission resource is that frequency domain is followed by time domain. When the CCE-to-REG resource mapping is performed by using the time-first resource mapping manner, a mapping sequence for REGs belonging to a same CCE in the downlink transmission resource is that time domain is followed by frequency domain. In addition, the foregoing several CCE-to-REG resource mapping manners support REG bundling in both time domain and frequency domain, and each type of REG bundling includes a plurality of REGs belonging to a same CCE. When the CCE-to-REG resource mapping is performed on the control channel, all REGs of one type of REG bundling in frequency domain are continuously mapped in frequency domain of the downlink transmission resource, and all REGs of one type of REG bundling in time domain are continuously mapped in time domain of the downlink transmission resource. A REG bundling size in frequency domain may be considered as a frequency domain resource scheduling granularity of the control channel.

On the control resource set, the network device uses different CCE-to-REG mapping manners described above, and when symbols occupied by the control channel in time domain are different, REG bundling sizes in frequency domain may be different. However, an idle resource may exist in the control region when resource mapping is performed on the control channel.

Currently, in the NR standard, the data channel is allowed to reuse the idle resource in the control region, to improve resource utilization, in other words, the idle resource in the control region may be used to transmit the data channel. The idle resource in the control region herein also includes an idle resource in the control resource set. When these idle resources are used by the data channel, in an existing LTE technology, a frequency domain resource scheduling granularity of the data channel is only related to system bandwidth. Therefore, the frequency domain resource scheduling granularity of the data channel may be different from the REG bundling size of the control channel in frequency domain. Consequently, some idle resources in the control region cannot be scheduled for the data channel, and resource utilization is affected.

The resource mapping method provided in this application aims to resolve a technical problem that a manner in Which the network device allocates a resource to the data channel is required. Some embodiments are used below to describe in detail the technical solutions of this application. The following several embodiments may be combined with each other, and a same or similar concept or process may not be described again in some embodiments.

Figure 5:
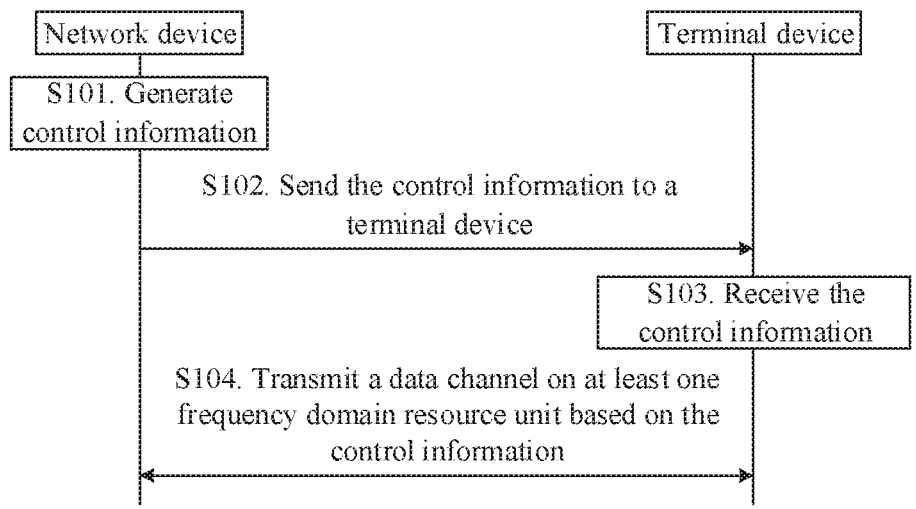
FIG. 5 is a signaling flowchart of a resource mapping method according to this application.

FIG. 5 is a signaling flowchart of a resource mapping method according to this application. In this embodiment, a network device indicates, by using control information, at least one frequency domain resource unit scheduled for a terminal device, so that the terminal device can transmit a data channel on the at least one frequency domain resource unit. As shown in FIG. 5, the method may include the following steps.

S101. The network device generates the control information.

The control information is used to indicate at least one type of the following information: at least one bandwidth region in which at least one frequency domain resource unit is located, a granularity of the frequency domain resource unit, and a location of the frequency domain resource unit in the bandwidth region; the frequency domain resource unit is a scheduling unit of a frequency domain resource used when the network device and the terminal device transmit a data channel, the granularity of the resource unit is corresponding to a granularity of a resource unit used when the network device and the terminal device transmit a control channel, operating bandwidth of the terminal device includes a plurality of evenly spaced bandwidth regions, and the at least one bandwidth region is one or more of the plurality of bandwidth regions.

The control information may be dynamic control information carried on a downlink control channel, for example, DCI carried on a PDCCH, or may be other dynamic information. This is not limited in this application.

The frequency domain resource unit may be a resource block group (RBG), and the RBG is a group of continuous resource blocks in frequency domain, or may be another frequency domain resource unit. This is not limited in this embodiment of this application.

A size P of the bandwidth region may be predefined by a system, or may be configured by using higher layer signaling such as radio resource control (RRC) signaling or media access control (MAC) signaling, and P may be determined in a resource block. In a possible implementation, P may be a maximum granularity of the frequency domain resource unit. Therefore, system bandwidth may be divided into a plurality of evenly spaced bandwidth regions. When a system bandwidth value cannot be divisible by P, remaining frequency domain resources may be still considered as a bandwidth region.

Figure 6:
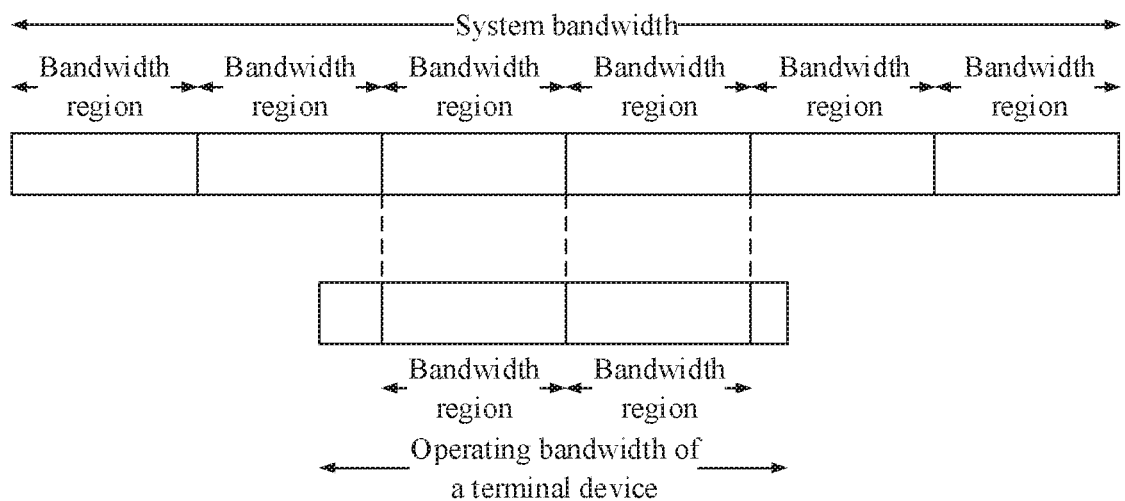
FIG. 6 is a schematic diagram of operating bandwidth of a terminal device according to this application.

FIG. 6 is a schematic diagram of operating bandwidth of a terminal device according to this application. As shown in FIG. 6, for a specific terminal device, because operating bandwidth of the terminal device may be a part of system bandwidth, and an access location of the terminal device is flexible in the system bandwidth, the foregoing plurality of bandwidth regions may not be obtained through division based on the operating bandwidth of the specific terminal device, but the operating bandwidth of the terminal device may still include the plurality of bandwidth regions. Optionally, a start location of the operating bandwidth of the terminal device is aligned with a start location of one bandwidth region.

Optionally, the granularity of the resource unit of the data channel is a granularity of a resource unit in at least one resource unit of a control channel. For details, refer to the following description.

Because a granularity of a resource unit scheduled on a data channel is the same as a granularity of the control channel, when a resource region in which the control channel is located is reused to transmit the foregoing data channel, a resource may be wasted because of different scheduling granularities. Herein, the resource region in which the control channel is located may be, for example, the control region described above. In other words, the foregoing at least one frequency domain resource unit may be located in a control region and a data region of a downlink transmission resource in time domain. In this manner, an idle resource in the control region may be reused by the data channel for data transmission, to improve resource utilization.

When one or more pieces of predefined information exist in the foregoing information, the foregoing control information is used to indicate only non-predefined information. For example, when the granularity of the frequency domain resource unit and the location of the frequency domain resource unit in the bandwidth region are predefined information, the foregoing control information may be used to indicate the at least one bandwidth region in which the at least one frequency domain resource unit is located. When no predefined information exists in the foregoing information, the foregoing control information may be used to indicate the at least one bandwidth region in which the at least one frequency domain resource unit is located, the granularity of the frequency domain resource unit, and the location of the frequency domain resource unit in the bandwidth region.

Alternatively, the network device indicates some information in the foregoing information by using the control information, and the network device indicates other information of the foregoing information by using other indication information. For example, the network device indicates, by using the control information, the granularity of the frequency domain resource unit and the location of the frequency domain resource unit in the bandwidth region, and indicates, by using other indication information, the at least one bandwidth region in which the at least one frequency domain resource unit is located. For example, the other indication information herein may be carried in any one of the following signaling and sent to the terminal device, for example, physical layer signaling, radio resource control (RRC) signaling, or media access control (MAC) signaling.

S102. The network device sends the control information to the terminal device.

It should be understood that there may be one or more terminal devices. In other words, the network device may send corresponding control information to each terminal device. For example, the network device sends a control channel on which the control information is located to each terminal device, or may send common or broadcast control information to a plurality of terminal devices. For example, the network device sends a common control channel (for example, a Group-common PDCCH) on which the control information is located to a group of terminal devices.

S103. The terminal device receives the control information.

S104. The terminal device transmits the data channel on the at least one frequency domain resource unit based on the control information.

For example, when the control information indicates the at least one bandwidth region in which the at least one frequency domain resource unit is located, the granularity of the frequency domain resource unit, and the location of the frequency domain resource unit in the bandwidth region, the terminal device may determine a location of the at least one frequency domain resource unit in frequency domain based on the at least one bandwidth region in which the at least one frequency domain resource unit is located, the granularity of the frequency domain resource unit, and the location of the frequency domain resource unit in the bandwidth region, and then transmit the data channel on the at least one frequency domain resource unit. For example, the terminal device sends an uplink data channel to the network device, or the network device sends a downlink data channel to the terminal device.

For example, when the predefined information exists in "the at least one bandwidth region in which the at least one frequency domain resource unit is located, the granularity of the frequency domain resource unit, and the location of the frequency domain resource unit in the bandwidth region", the terminal device may obtain, based on the non-predefined information indicated by the control channel and the predefined information, the at least one bandwidth region in which the at least one frequency domain resource unit is located, the granularity of the frequency domain resource unit, and the location of the frequency domain resource unit in the bandwidth region. Further, the terminal device may determine the location of the at least one frequency domain resource unit in frequency domain based on the at least one bandwidth region in which the at least one frequency domain resource unit is located, the granularity of the frequency domain resource unit, and the location of the frequency domain resource unit in the bandwidth region, and further transmit the data channel on the at least one frequency domain resource unit. For example, the terminal device sends the uplink data channel to the network device, or the network device sends the downlink data channel to the terminal device.

For example, when the network device indicates some information in the foregoing information by using the control information, and indicates other information of the foregoing information by using other indication information, the terminal device may obtain, by using the control information and the other indication information, the at least one bandwidth region in which the at least one frequency domain resource unit is located, the granularity of the frequency domain resource unit, and the location of the frequency domain resource unit in the bandwidth region. Further, the terminal device may determine the location of the at least one frequency domain resource unit in frequency domain based on the at least one bandwidth region in which the at least one frequency domain resource unit is located, the granularity of the frequency domain resource unit, and the location of the frequency domain resource unit in the bandwidth region, and further transmit the data channel on the at least one frequency domain resource unit. For example, the terminal device sends the uplink data channel to the network device, or the network device sends the downlink data channel to the terminal device.

In the resource mapping method provided in this application, the system bandwidth is divided into a plurality of evenly spaced bandwidth regions, so that the network device schedules, by using the frequency domain resource unit as a scheduling unit of the frequency domain resource, at least one frequency domain resource unit in at least one of the plurality of bandwidth regions to serve as a frequency domain resource used when the network device and the terminal device transmit a data channel, and indicates scheduling information by using the control information. Because the at least one frequency domain resource unit may be located in a control region and a data region of a downlink transmission resource in time domain, in this manner, the data channel may reuse the idle resource in the control region for data transmission, to improve resource utilization.

As described in the foregoing embodiment, the granularity of the frequency domain resource unit is used to represent bandwidth occupied by the frequency domain resource unit in the bandwidth region. In a possible implementation, the granularity of the frequency domain resource unit may be corresponding to a granularity of a resource unit of the control channel. The granularity of the resource unit of the control channel may be a REG bundling size in frequency domain. The REG bundling in frequency domain refers to a group of continuous REG resources in frequency domain, or may be a resource unit of another control channel. This is not limited in this embodiment of this application.

A manner of a correspondence between the granularity of the frequency domain resource unit and the granularity of the resource unit of the control channel may include the following two cases:

Case 1: A plurality of control channels with different granularities of control resource units exist in the control region, and a granularity of a frequency domain resource unit of the terminal device is a granularity of a control resource unit in at least one control resource unit of the control channel.

Case 2: The granularity of the frequency domain resource unit of the terminal device is the same as a granularity of a control frequency domain resource unit (for example, a REG bundling size in frequency domain) of a control channel of the terminal device.

For example, the case 2 may have the following possible implementation:

For example, two CCEs are used on the control channel for transmission, and each CCE includes six REGs. The two CCEs are respectively a CCE 0 and a CCE 1. Indexes of six REGs included in the CCE 0 are respectively 0, 1, 2, 3, 4, and 5. Indexes of six REGs included in the CCE 1 are respectively 6, 7, 8, 9, 10, and 11.

Figure 7:
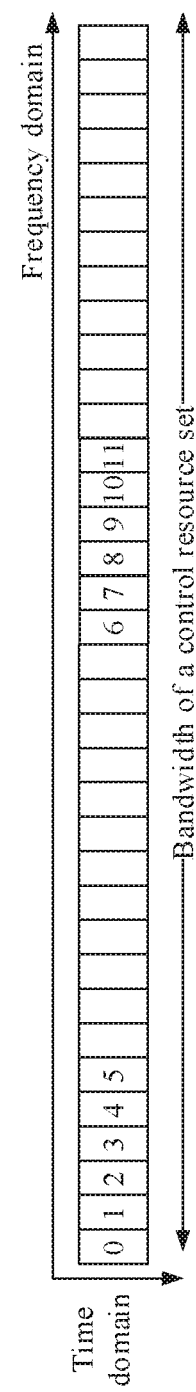
FIG. 7 is a schematic diagram of a resource mapping manner according to this application.

FIG. 7 is a schematic diagram of a resource mapping manner according to this application. As shown in FIG. 7, resource mapping manners of the terminal device on the control channel are a continuous (Localized) resource mapping manner and a frequency-first resource mapping manner. The control channel occupies one OFDM symbol in time domain, one REG bundling size of the CCE in frequency domain is 6, and a size of an RBG of the data channel of the terminal device is 6.

Figure 8:
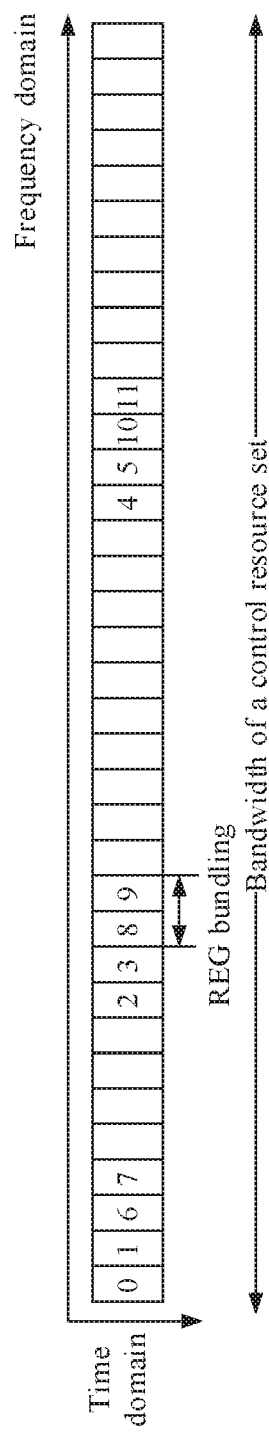
FIG. 8 is a schematic diagram of another resource mapping manner according to this application.

FIG. 8 is a schematic diagram of another resource mapping manner according to this application. As shown in FIG. 8, resource mapping manners of the terminal device on the control channel are a distributed resource mapping manner and a frequency-first resource mapping manner. The control channel occupies one OFDM symbol in time domain, one REG bundling size of the CCE in frequency domain is 2, and a size of an RBG of the data channel of the terminal device is 2.

Figure 9:
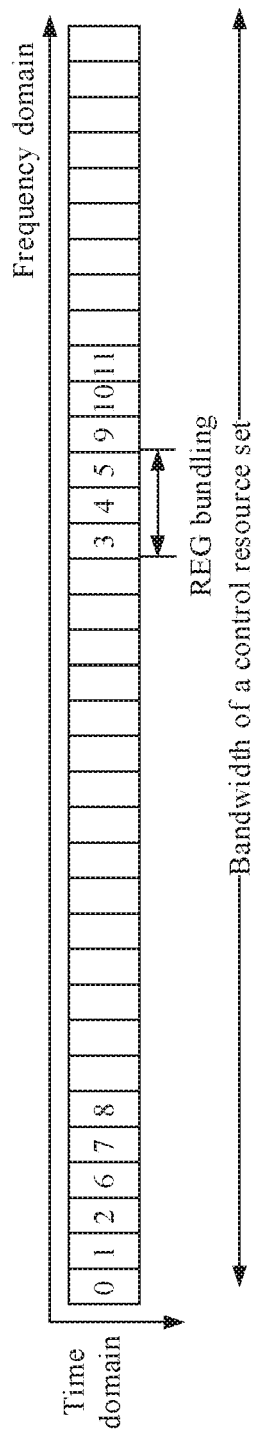
FIG. 9 is a schematic diagram of still another resource mapping manner according to this application.

FIG. 9 is a schematic diagram of still another resource mapping manner according to this application. As shown in FIG. 9, resource mapping manners of the terminal device on the control channel are a distributed resource mapping manner and a frequency-first resource mapping manner. The control channel occupies one OFDM symbol in time domain, one REG bundling size of the CCE in frequency domain is 3, and a size of an RBG of the data channel of the terminal device is 3.

Figure 10:
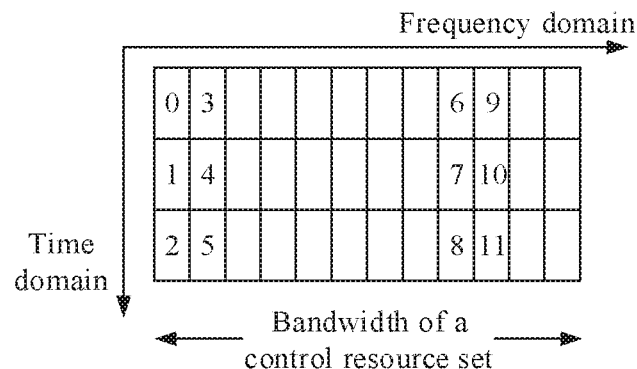
FIG. 10 is a schematic diagram of still another resource mapping manner according to this application.

FIG. 10 is a schematic diagram of still another resource mapping manner according to this application. As shown in FIG. 10, resource mapping manners of the terminal device on the control channel are a continuous (Localized) resource mapping manner and a time-first resource mapping manner. The control channel occupies three OFDM symbols in time domain, one REG bundling size of the CCE in frequency domain is 2, and a size of an RBG of the data channel of the terminal device is 3.

Figure 11:
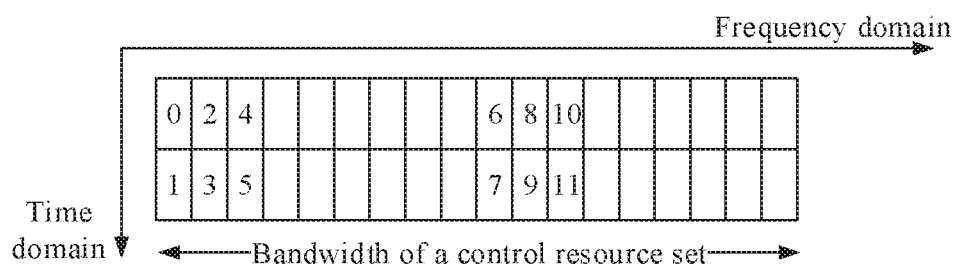
FIG. 11 is a schematic diagram of still another resource mapping manner according to this application.

FIG. 11 is a schematic diagram of still another resource mapping manner according to this application. As shown in FIG. 11, resource mapping manners of the terminal device on the control channel are a continuous (Localized) resource mapping manner and a time-first resource mapping manner. The control channel occupies two OFDM symbols in time domain, one REG bundling size of the CCE in frequency domain is 3, and a size of an RBG of the data channel of the terminal device is 3.

Figure 12:
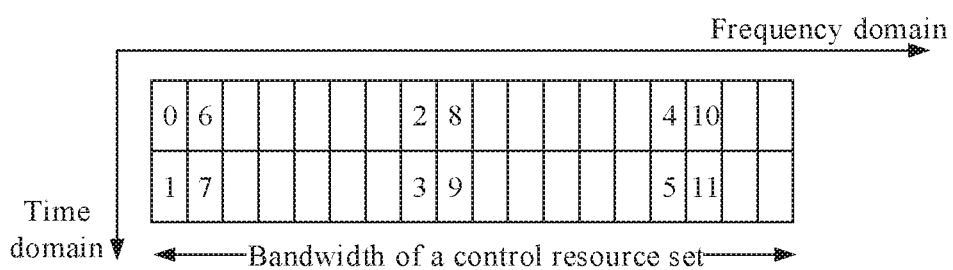
FIG. 12 is a schematic diagram of still another resource mapping manner according to this application.

FIG. 12 is a schematic diagram of still another resource mapping manner according to this application. As shown in FIG. 12, resource mapping manners of the terminal device on the control channel are a distributed resource mapping manner and a time-first resource mapping manner. The control channel occupies two OFDM symbols in time domain, one REG bundling size of the CCE in frequency domain is 1, and a size of an RBG of the data channel of the terminal device is 1.

Figure 13:
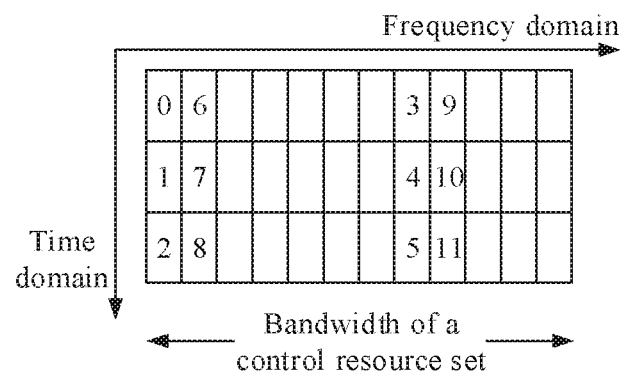
FIG. 13 is a schematic diagram of still another resource mapping manner according to this application.

FIG. 13 is a schematic diagram of still another resource mapping manner according to this application. As shown in FIG. 13, resource mapping manners of the terminal device on the control channel are a distributed resource mapping manner and a time-first resource mapping manner. The control channel occupies three OFDM symbols in time domain, one REG bundling size of the CCE in frequency domain is 1, and a size of an RBG of the data channel of the terminal device is 1.

In this manner, a resource mapping granularity of the data channel in frequency domain may be consistent with a resource mapping granularity of the control channel in frequency domain.

The granularity of the frequency domain resource unit may be corresponding to the granularity of the resource unit of the control channel, and the size of the bandwidth region may be preconfigured or configured by using the higher layer signaling. That the control information is used to indicate the at least one bandwidth region in which the at least one frequency domain resource unit is located, the granularity of the frequency domain resource unit, and the location of the frequency domain resource unit in the bandwidth region is used as an example to describe an implementation in which the network device indicates these types of information by using the control information. The implementation may include the following two cases:

Case 1: In this embodiment, a first resource mapping mode set may be predefined in the network device and the terminal device. The first resource mapping mode set includes at least one resource mapping mode. Each resource mapping mode includes a granularity of a frequency domain resource unit and a frequency domain location of the frequency domain resource unit in a bandwidth region. Therefore, the network device may obtain the first resource mapping mode set.

Therefore, the network device may select, from the plurality of bandwidth regions based on resource scheduling statuses of all control channels (including a control channel sent to the current terminal device and a control channel sent to another terminal device) on the operating bandwidth of the terminal device, at least one bandwidth region that can be scheduled for the terminal device. Then the network device may select a granularity of the frequency domain resource unit based on a REG bundling size used when resource mapping is performed on the control channel. Finally, the network device may select a resource mapping mode from the first resource mapping mode set based on a frequency domain location in which an idle resource in each bandwidth region is located and the granularity of the frequency domain resource unit, so that the data channel can reuse an idle frequency domain resource in the control region for data transmission to maximum extent, thereby improving resource utilization.

In the foregoing scenario, the control information may include a first information field and a second information field.

The first information field is used to indicate at least one bandwidth region in which at least one frequency domain resource unit is located. A manner in which the first information field indicates the at least one bandwidth region in which the at least one frequency domain resource unit is located is not limited in this embodiment. In an implementation of this application, the first information field may include a bitmap used to indicate the at least one bandwidth region in which the at least one frequency domain resource unit is located. Each bit of the bitmap is corresponding to one bandwidth region. In other words, a quantity of bandwidth regions obtained by dividing the operating bandwidth of the terminal device is equal to a quantity of bits of the bitmap. Optionally, when a specific bit in the bitmap is 1, it indicates that a bandwidth region corresponding to the bit is a bandwidth region in which the frequency domain resource unit is located. Alternatively, when a specific bit in the bitmap is 0, it indicates that a bandwidth region corresponding to the bit is a bandwidth region in which the frequency domain resource unit is located. A specific bit in the bitmap may be specifically determined based on a system setting.

The second information field is used to indicate a specific resource mapping mode in the first resource mapping mode set, to indicate, by using the indicated resource mapping mode, a granularity of a frequency domain resource unit indicated by the resource mapping mode and a frequency domain location of the frequency domain resource unit in the bandwidth region. Optionally, each resource mapping mode in the at least one resource mapping mode included in the first resource mapping mode set is corresponding to an identifier, and the second information field may indicate the resource mapping mode in a manner of adding an identifier corresponding to a specific resource mapping mode. The identifier may be, for example, any identifier that can uniquely mark a resource mapping mode. For example, the identifier may be an index number of each resource mapping mode in the first resource mapping mode set, or may be alternatively a name of each resource mapping mode. FIG. 13 is a schematic diagram indicating an index number of each resource mapping mode in the first resource mapping mode set is used as an identifier corresponding to each resource mapping mode.

It should be noted that the first information field and the second information field may be combined into one information field. In other words, the first information field and the second information field may be two fields in one information field.

It should be noted that a quantity of bits in the second information field may be determined based on a quantity of first resource mapping modes in the first resource mapping mode set.

Correspondingly, after receiving the control information sent by the network device, the terminal device may first obtain the first resource mapping mode set, to determine, with reference to the first resource mapping mode set and the control information, the location that is of the at least one frequency domain resource unit in frequency domain and that is indicated by the control information, and then transmit the data channel on the at least one frequency domain resource unit.

Figure 14:
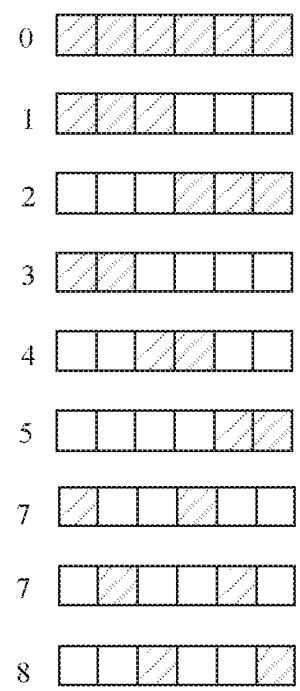
FIG. 14 is a schematic diagram of a first resource mapping mode set according to this application.

FIG. 14 is a schematic diagram of a first resource mapping mode set according to this application. For example, the granularity of the frequency domain resource unit is six RBs, three RBs, two RBs, or one RB. In this case, a maximum granularity of the frequency domain resource unit is six RBs. It is assumed that each bandwidth region includes 6 RB resources. In this scenario, resource mapping modes included in the first resource mapping mode set may be shown in FIG. 14. An identifier corresponding to each resource mapping mode is an index of each resource mapping mode in the first resource mapping mode set. If the frequency domain resource unit is a resource block group RBG a size of the RBG may be 1, 2, 3, or 6.

Each row in FIG. 14 represents one resource mapping mode, and a square filled with slashes is a frequency domain resource unit. A resource mapping mode with an index number of 0 is used as an example. A granularity of a frequency domain resource unit in the resource mapping mode is six RBs, and a frequency domain location of the frequency domain resource unit in a bandwidth region is all RBs in the bandwidth region. A resource mapping mode with an index number of 4 is used as an example. A granularity of a frequency domain resource unit in the resource mapping mode is two REGs, and a frequency domain location of the frequency domain resource unit in a bandwidth region is a third RB and a fourth RB in the bandwidth region. A resource mapping mode with an index number of 8 is used as an example. A granularity of a frequency domain resource unit in the resource mapping mode is one RB, and two frequency domain resource units may be included in the bandwidth region. A frequency domain location of one frequency domain resource unit in the bandwidth region is a third RB in the bandwidth region, and a frequency domain location of the other frequency domain resource unit in the bandwidth region is a sixth RB in the bandwidth region. In addition, because there are nine first resource mapping modes in the first resource mapping mode set, the quantity of bits in the second information field is 4.

It should be noted that the size of the bandwidth region shown in FIG. 14 is merely an example, and this application is not limited thereto. Optionally, when the bandwidth region is relatively large, the network device may schedule one or more frequency domain resource units or the like in a bandwidth region based on the granularity of the frequency domain resource unit. An implementation and a principle are similar to those in the foregoing embodiment. Details are not described herein again.

Case 2: A difference from the foregoing case 1 is that resource mapping modes included in the first resource mapping mode set shown in the case 1 may be adapted to any CCE-to-REG resource mapping manner of the control channel. However, in this embodiment, the first resource mapping mode set is corresponding to a CCE-to-REG resource mapping manner of the control channel. In other words, a plurality of candidate resource mapping mode sets may be predefined in the network device. Each candidate resource mapping mode set is corresponding to a CCE-to-REG resource mapping manner of the control channel. Each candidate resource mapping mode set includes at least one resource mapping mode. Resource mapping modes included in one candidate resource mapping mode set are not all the same as those in any other candidate resource mapping mode set. In other words, same resource mapping modes may exist in any two candidate resource mapping mode sets. Candidate resource mapping mode sets are different.

Therefore, the network device may select, from the plurality of bandwidth regions based on resource scheduling statuses of all control channels (including control channels sent to the current terminal device and control channels sent to another terminal device) on the operating bandwidth of the terminal device, at least one bandwidth region that can be scheduled for the terminal device. Then the network device may select the first resource mapping mode set from the plurality of candidate resource mapping mode sets based on the CCE-to-REG resource mapping manner of the control channel. Finally, the network device may select a granularity of the frequency domain resource unit based on a REG bundling size used when resource mapping is performed on the control channel. The network device selects a resource mapping mode from the first resource mapping mode set based on a frequency domain location in which an idle resource in each bandwidth region is located and the granularity of the frequency domain resource unit, so that the data channel can reuse an idle frequency domain resource in the control region for data transmission to maximum extent, thereby improving resource utilization.

In the foregoing scenario, when the foregoing terminal device also predefines a plurality of candidate resource mapping mode sets, the foregoing control information may include a first information field, a second information field, and a third information field. The first information field is used to indicate the at least one bandwidth region in which the at least one frequency domain resource unit is located, the second information field is used to indicate a specific resource mapping mode in the first resource mapping mode set, and the third information field is used to indicate the first resource mapping mode set from the plurality of candidate resource mapping mode sets. Optionally, each resource mapping mode set included in the plurality of candidate resource mapping mode sets is corresponding to an identifier, and the third information field may indicate the resource mapping mode set in a manner of adding an identifier corresponding to a specific resource mapping mode set. The identifier may be, for example, any identifier that can uniquely mark a resource mapping mode set, for example, an index number or a name.

Correspondingly, after receiving the control information sent by the network device, the terminal device may obtain the first resource mapping mode set from the plurality of candidate resource mapping mode sets based on third control information, to determine, with reference to the first resource mapping mode set and the first information field and the second information field of the control information, a location that is of the at least one frequency domain resource unit in frequency domain and that is indicated by the control information, and further transmit the data channel on the at least one frequency domain resource unit.

Alternatively, the control information still includes only the first information field and the second information field. After obtaining the first resource mapping mode set, the network device may send indication information to the terminal device. The indication information is used to indicate the first resource mapping mode set from the plurality of candidate resource mapping mode sets. In this way, the terminal device may combine the indication information and the control information for use, to determine the first resource mapping mode set from the plurality of candidate resource mapping mode sets, then determine the location of the at least one frequency domain resource unit in frequency domain based on the first information field and the second information field, and further transmit the data channel on the at least one frequency domain resource unit. Optionally, the indication information may be carried in higher layer signaling and sent to the terminal device, for example, physical layer signaling, radio resource control (RRC) signaling, or media access control (MAC) signaling. When the indication information is carried in the MAC signaling, the indication information may be specifically carried in a MAC control element (CE).

Correspondingly, after receiving the indication information and the control information sent by the network device, the terminal device may obtain the first resource mapping mode set from the plurality of candidate resource mapping mode sets based on the indication information, to determine, with reference to the first resource mapping mode set and the first information field and the second information field of the control information, the location that is of the at least one frequency domain resource unit in frequency domain and that is indicated by the control information, and further transmit the data channel on the at least one frequency domain resource unit.

Figure 15:
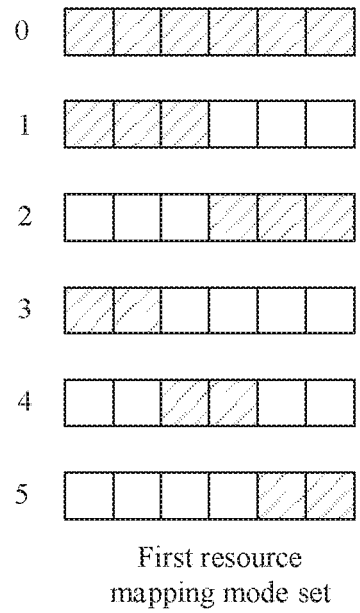
FIG. 15 is a schematic diagram of another first resource mapping mode set according to this application.
Figure 16:
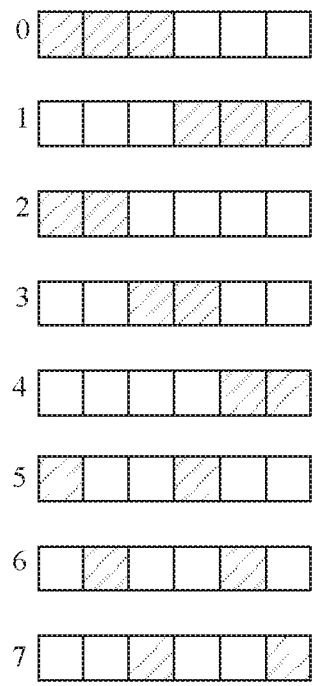
FIG. 16 is a schematic diagram of still another first resource mapping mode set according to this application.

FIG. 15 is a schematic diagram of another first resource mapping mode set according to this application. FIG. 16 is a schematic diagram of still another first resource mapping mode set according to this application. It is assumed that the plurality of candidate resource mapping mode sets include the first resource mode set and the second resource mode set. A CCE-to-REG resource mapping manner of the control channel that is corresponding to the first resource mapping mode set is a frequency-first resource mapping mode. A CCE-to-REG resource mapping manner of the control channel that is corresponding to the second resource mapping mode set is a time-first resource mapping mode.

That the granularity of the frequency domain resource unit is six RBs, three RBs, two RBs, or one RB is still used as an example. In this case, a maximum granularity of the frequency domain resource unit is six RBs. It is assumed that each bandwidth region includes six RBs.

As described in the foregoing embodiment, when the frequency-first resource mapping mode is used to perform resource mapping on the control channel, a REG bundling size in frequency domain may be 2, 3, or 6. Therefore, resource mapping modes included in the first resource mapping mode set may be shown in FIG. 15. An identifier corresponding to each resource mapping mode is an index of each resource mapping mode in the first resource mapping mode set.

As described in the foregoing embodiment, when the time-first resource mapping mode is used to perform resource mapping on the control channel, the REG bundling size in frequency domain may be 1, 2, or 3. Therefore, resource mapping modes included in the second resource mapping mode set may be shown in FIG. 16. An identifier corresponding to each resource mapping mode is an index of each resource mapping mode in the first resource mapping mode set.

It should be noted that the size of the bandwidth region shown in FIG. 15 or FIG. 16 is merely an example. This application is not limited thereto. Optionally, when the bandwidth region is relatively large, the network device may schedule one or more frequency domain resource units or the like in a bandwidth region based on the granularity of the frequency domain resource unit. An implementation and a principle are similar to those in the foregoing embodiment. Details are not described herein again.

In the resource mapping method provided in this application, the system bandwidth is divided into a plurality of evenly spaced bandwidth regions, so that the network device schedules, by using the frequency domain resource unit as a scheduling unit of the frequency domain resource, at least one frequency domain resource unit in at least one of the plurality of bandwidth regions to serve as a frequency domain resource used when the network device and the terminal device transmit a data channel, and indicates scheduling information by using the control information. Because the at least one frequency domain resource unit may be located in a control region and a data region of a downlink transmission resource in time domain, in this manner, the data channel may reuse the idle resource in the control region for data transmission, to improve resource utilization.

Figure 17:
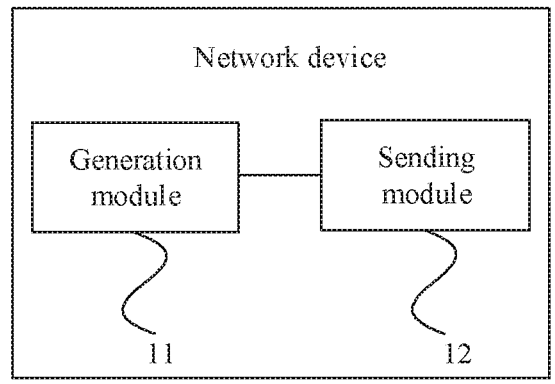
FIG. 17 is a schematic structural diagram of a network device according to this application.

FIG. 17 is a schematic structural diagram of a network device according to this application. As shown in FIG. 17, the network device may include a generation module 11 and a sending module 12.

The generation module 11 is configured to generate control information, where the control information is used to indicate at least one type of the following information: at least one bandwidth region in which at least one frequency domain resource unit is located, a granularity of the frequency domain resource unit, and a location of the frequency domain resource unit in the bandwidth region; the frequency domain resource unit is a scheduling unit of a frequency domain resource used when the network device and a terminal device transmit a data channel, the granularity of the resource unit is corresponding to a granularity of a resource unit used when the network device and the terminal device transmit a control channel, operating bandwidth of the terminal device includes a plurality of evenly spaced bandwidth regions, and the at least one bandwidth region is one or more of the plurality of bandwidth regions.

The sending module 12 is configured to send the control information to the terminal device.

Optionally, that the granularity of the resource unit is corresponding to a granularity of a resource unit used when the network device and the terminal device transmit a control channel may include: the granularity of the resource unit is a granularity of a resource unit in at least one resource unit used when the control channel is transmitted.

Figure 18:
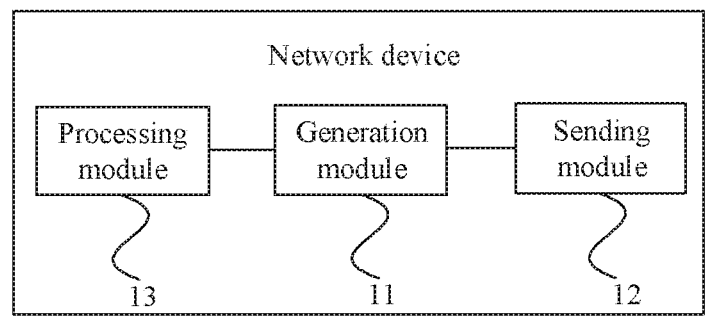
FIG. 18 is a schematic structural diagram of another network device according to this application.

FIG. 18 is a schematic structural diagram of another network device according to this application. As shown in FIG. 18, based on the block diagram shown in FIG. 17. The network device may further include:

a processing module 13, configured to: configure a size of the at least one bandwidth region for the terminal device by using the higher layer signaling; or obtain a predefined size of the at least one bandwidth region.

Figure 19:
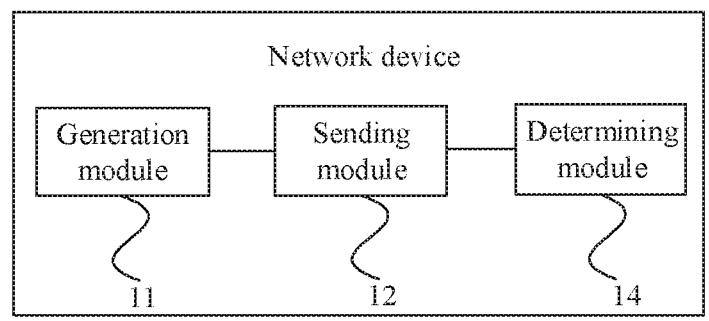
FIG. 19 is a schematic structural diagram of still another network device according to this application.

FIG. 19 is a schematic structural diagram of still another network device according to this application. As shown in FIG. 19, based on the block diagram shown in FIG. 17, the network device may further include:

a determining module 14, configured to determine a first resource mapping mode set, where the first resource mapping mode set includes at least one resource mapping mode, and the resource mapping mode includes the granularity of the frequency domain resource unit and a frequency domain location of the frequency domain resource unit in the bandwidth region.

The control information includes a first information field and/or a second information field, the first information field is used to indicate the at least one bandwidth region in which the at least one frequency domain resource unit is located, and the second information field is used to indicate the resource mapping mode. For example, the first information field includes a bitmap, and the bitmap is used to indicate the at least one bandwidth region in which the at least one frequency domain resource unit is located; and each bit in the bitmap is corresponding to one bandwidth region. For example, each resource mapping mode in the at least one first resource mapping mode is corresponding to an identifier, and that the second information field is used to indicate the resource mapping mode includes: the second information field includes an identifier corresponding to the resource mapping mode. Optionally, the first resource mapping mode set is a specific resource mapping mode configured by the network device for the terminal device, and a quantity of bits in the second information field is determined based on a quantity of first resource mapping modes in the first resource mapping mode set.

Optionally, the sending module 12 is further configured to: after the determining module 14 determines the first resource mapping mode set, send indication information to the terminal device, where the indication information is used to indicate the first resource mapping mode set from a plurality of candidate resource mapping mode sets. For example, the indication information may be carried in higher layer signaling. For example, the plurality of candidate resource mapping mode sets may include the first resource mapping mode set and a second resource mapping mode set, and resource mapping modes in the first resource mapping mode set are not all the same as resource mapping modes in the second resource mapping mode set.

Optionally, the control information further includes a third information field, and the indication information is carried in the third information field.

The network device provided in this application may perform actions on a network device side in the foregoing method embodiment shown in FIG. 5. An implementation principle and a technical effect of the network device are similar to those in the foregoing method embodiment. Details are not described herein again.

Figure 20:
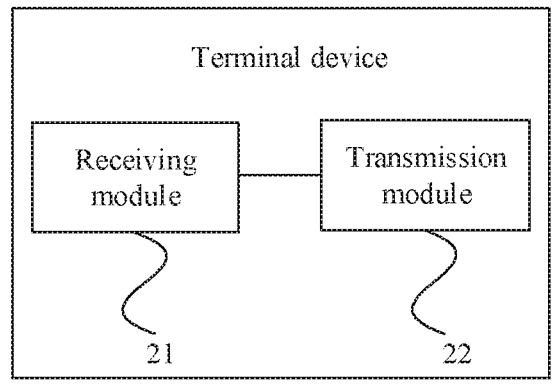
FIG. 20 is a schematic structural diagram of a terminal device according to this application.

FIG. 20 is a schematic structural diagram of a terminal device according to this application. As shown in FIG. 20, the terminal device may include a receiving module 21 and a transmission module 22.

The receiving module 21 is configured to receive control information sent by a network device, where the control information is used to indicate at least one type of the following information: at least one bandwidth region in which at least one frequency domain resource unit is located, a granularity of the frequency domain resource unit, and a location of the frequency domain resource unit in the bandwidth region; the frequency domain resource unit is a scheduling unit of a frequency domain resource used when the terminal device and the network device transmit a data channel, the granularity of the resource unit is corresponding to a granularity of a resource unit used when the network device and the terminal device transmit a control channel, operating bandwidth of the terminal device includes a plurality of evenly spaced bandwidth regions, and the at least one bandwidth region is one or more of the plurality of bandwidth regions.

The transmission module 22 is configured to transmit the data channel on the at least one frequency domain resource unit based on the control information.

Optionally, that the granularity of the resource unit is corresponding to a granularity of a resource unit used when the network device and the terminal device transmit a control channel may include: the granularity of the resource unit is a granularity of a resource unit in at least one resource unit used when the control channel is transmitted.

Optionally, in another implementation of this application, the receiving module 21 is further configured to receive higher layer signaling sent by the network device, where the higher layer signaling is used to configure a size of the at least one bandwidth region.

Figure 21:
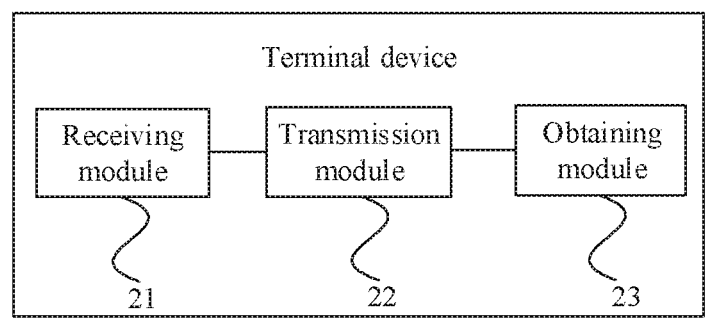
FIG. 21 is a schematic structural diagram of another terminal device according to this application.

FIG. 21 is a schematic structural diagram of another terminal device according to this application. As shown in FIG. 21, in another implementation of this application, based on the block diagram shown in FIG. 20. The terminal device may further include:

an obtaining module 23, configured to obtain a predefined size of the at least one bandwidth region.

Figure 22:
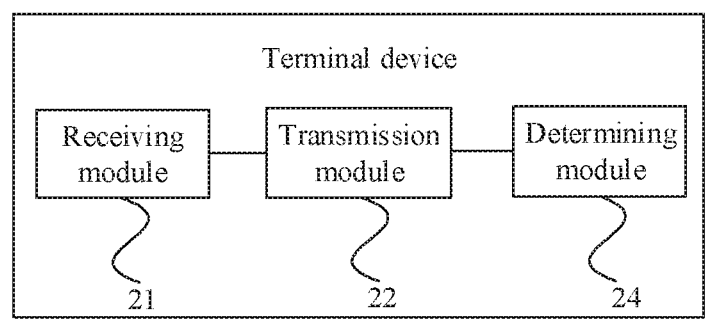
FIG. 22 is a schematic structural diagram of still another terminal device according to this application.

FIG. 22 is a schematic structural diagram of still another terminal device according to this application. As shown in FIG. 22, based on the block diagram shown in FIG. 20, the terminal device may further include:

a determining module 24, configured to determine a first resource mapping mode set, where the first resource mapping mode set includes at least one resource mapping mode, and the resource mapping mode includes the granularity of the frequency domain resource unit and a frequency domain location of the frequency domain resource unit in the bandwidth region.

The control information includes a first information field and/or a second information field, the first information field is used to indicate the at least one bandwidth region in which the at least one frequency domain resource unit is located, and the second information field is used to indicate the resource mapping mode. For example, the first information field includes a bitmap, and the bitmap is used to indicate the at least one bandwidth region in which the at least one frequency domain resource unit is located; and each bit in the bitmap is corresponding to one bandwidth region. For example, each resource mapping mode in the at least one first resource mapping mode is corresponding to an identifier, and that the second information field is used to indicate the resource mapping mode includes: the second information field includes an identifier corresponding to the resource mapping mode. Optionally, the first resource mapping mode set is a specific resource mapping mode configured by the network device for the terminal device, and a quantity of bits in the second information field is determined based on a quantity of first resource mapping modes in the first resource mapping mode set.

Optionally, the receiving module 21 is further configured to: before the determining module 24 determines the first resource mapping mode set, receive indication information sent by the network device, where the indication information is used to indicate the first resource mapping mode set from a plurality of candidate resource mapping mode sets. For example, the indication information may be carried in higher layer signaling. For example, the plurality of candidate resource mapping mode sets may include the first resource mapping mode set and a second resource mapping mode set, and resource mapping modes in the first resource mapping mode set are not all the same as resource mapping modes in the second resource mapping mode set.

Optionally, the control information further includes a third information field, and the indication information is carried in the third information field.

The terminal device provided in this application may perform actions on a terminal device side in the foregoing method embodiment shown in FIG. 5. An implementation principle and a technical effect of the terminal device are similar to those in the foregoing method embodiment. Details are not described herein again.

It should be noted that it should be understood that the sending module may be a transmitter when being actually implemented, the receiving module may be a receiver when being actually implemented, and the transmission module may be a transceiver when being actually implemented. Division of the determining module and the generation module is merely division of logical functions. All or some of modules on one device may be integrated in a physical entity or may be physically separated when being actually implemented. All the modules on one device may be implemented in a form of invoking software by a processing element, or may be implemented in a form of hardware. Alternatively, some modules may be implemented in a form of invoking software by a processing element, and some other modules are implemented in a form of hardware. For example, the determining module may be an independent processing element, and may be integrated in a specific chip of the foregoing device when being implemented. In addition, the determining module may be stored in a memory of a specific device in a form of program code, and is invoked by a processing element of the device, to perform a function of the determining module. Implementation of another module is similar to this. In addition, all or some of the modules on one device may be integrated or may be independently implemented. The processing element herein may be an integrated circuit with a signal processing capability. In an implementation process, steps of the foregoing method or foregoing modules on one device may be completed by using an integrated logic circuit of hardware in the processing element or an instruction in a form of software.

For example, the foregoing modules may be configured as one or more integrated circuits implementing the foregoing method, for example, one or more application-specific integrated circuits (ASIC), one or more microprocessors (digital signal processor, DSP), or one or more field programmable gate arrays (FPGA). For another example, when a specific module is implemented in a form of scheduling program code by a processing element, the processing element may be a general purpose processor, for example, a central processing unit (CPU for short) or another processor that may invoke the program code. For another example, the modules on one device may be integrated together and implemented in a form of System-On-a-Chip (SOC for short).

Figure 23:
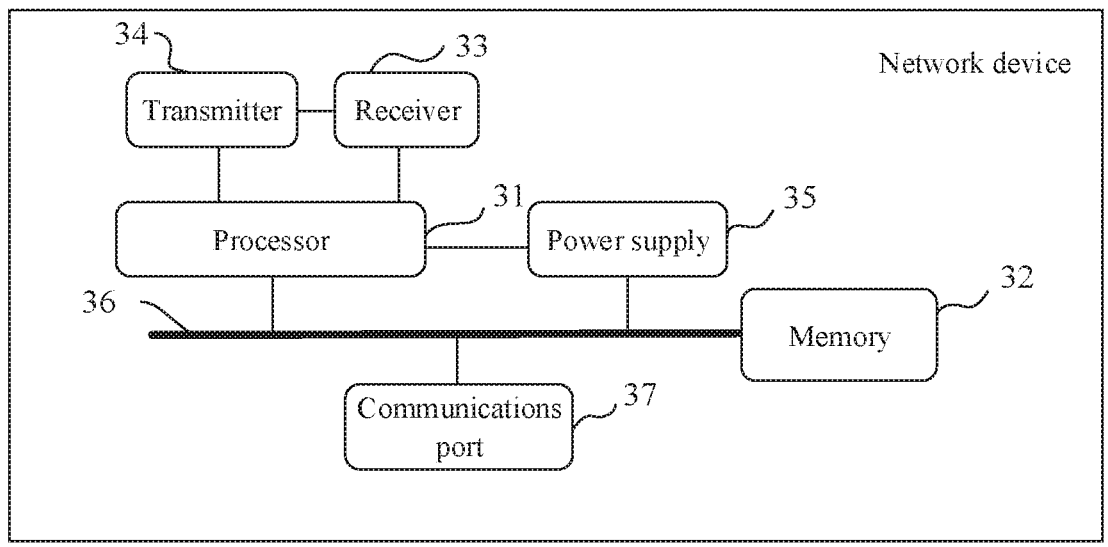
FIG. 23 is a schematic structural diagram of still another network device according to this application.

FIG. 23 is a schematic structural diagram of still another network device according to this application. As shown in FIG. 23, the network device may include a processor 31 (for example, a CPU), a memory 32, a receiver 33, and a transmitter 34. Both the receiver 33 and the transmitter 34 are coupled to the processor 31. The processor 31 controls a receiving action of the receiver 33, and the processor 31 controls a sending action of the transmitter 34. The memory 32 may include a high-speed RAM memory, and may further include a non-volatile memory NVM, for example, at least one magnetic disk storage. The memory 32 may store various instructions to complete various processing functions and implement method steps of this application. Optionally, the network device in this application may further include a power supply 35, a communications bus 36, and a communications port 37. The receiver 33 and the transmitter 34 may be integrated into a transceiver of the terminal device, or may be independent transceiver antennas of the terminal device. The communications bus 36 is configured to implement communication and connection between elements. The communications port 37 is configured to implement connection and communication between the terminal device and another peripheral.

In this application, the memory 32 is configured to store computer-executable program code, where the program code includes an instruction. When the processor 31 executes the instruction, the network device performs actions on a network device side in the foregoing method embodiment shown in FIG. 5, for example, step S101, step S102, and step S104. An implementation principle and a technical effect are similar. Details are not described herein again.

Figure 24:
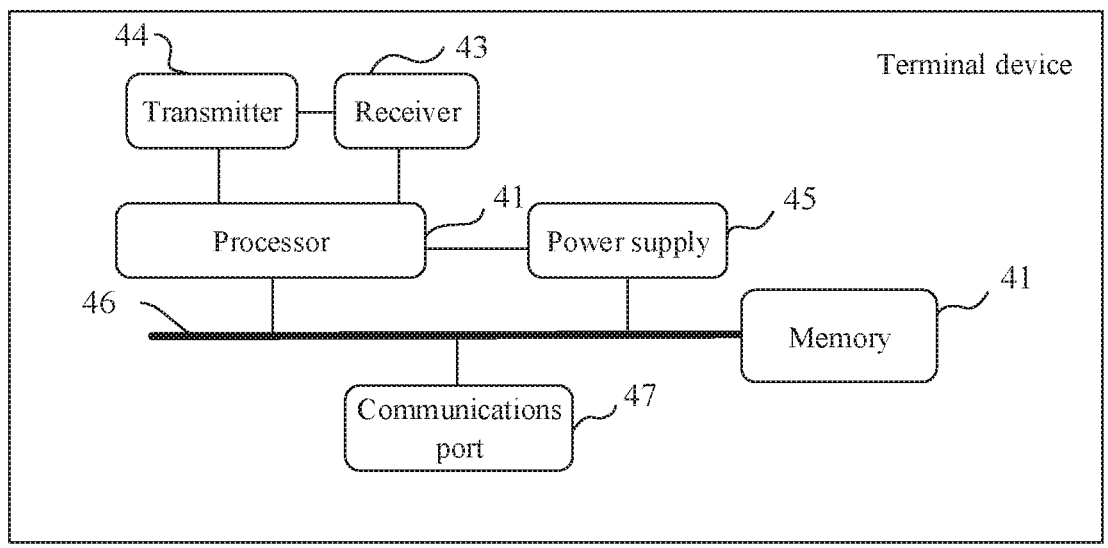
FIG. 24 is a schematic structural diagram of still another terminal device according to this application.

FIG. 24 is a schematic structural diagram of still another terminal device according to this application. As shown in FIG. 24, the terminal device may include a processor 41 (for example, a CPU), a memory 42, a receiver 43, and a transmitter 44. Both the receiver 43 and the transmitter 44 are coupled to the processor 41. The processor 41 controls a receiving action of the receiver 43, and the processor 41 controls a sending action of the transmitter 44. The memory 42 may include a high-speed RAM memory, and may further include a non-volatile memory NVM, for example, at least one magnetic disk storage. The memory 42 may store various instructions to complete various processing functions and implement method steps of this application. Optionally, the terminal device in this application may further include a power supply 45, a communications bus 46, and a communications port 47. The receiver 43 and the transmitter 44 may be integrated into a transceiver of the terminal device, or may be independent transceiver antennas of the terminal device. The communications bus 46 is configured to implement communication and connection between elements. The communications port 47 is configured to implement connection and communication between the terminal device and another peripheral.

In this application, the memory 42 is configured to store computer-executable program code, where the program code includes an instruction. When the processor 41 executes the instruction, the terminal device performs actions on a terminal device side in the foregoing method embodiment shown in FIG. 5, for example, step S103 and step S104. An implementation principle and a technical effect are similar. Details are not described herein again.

Figure 25:
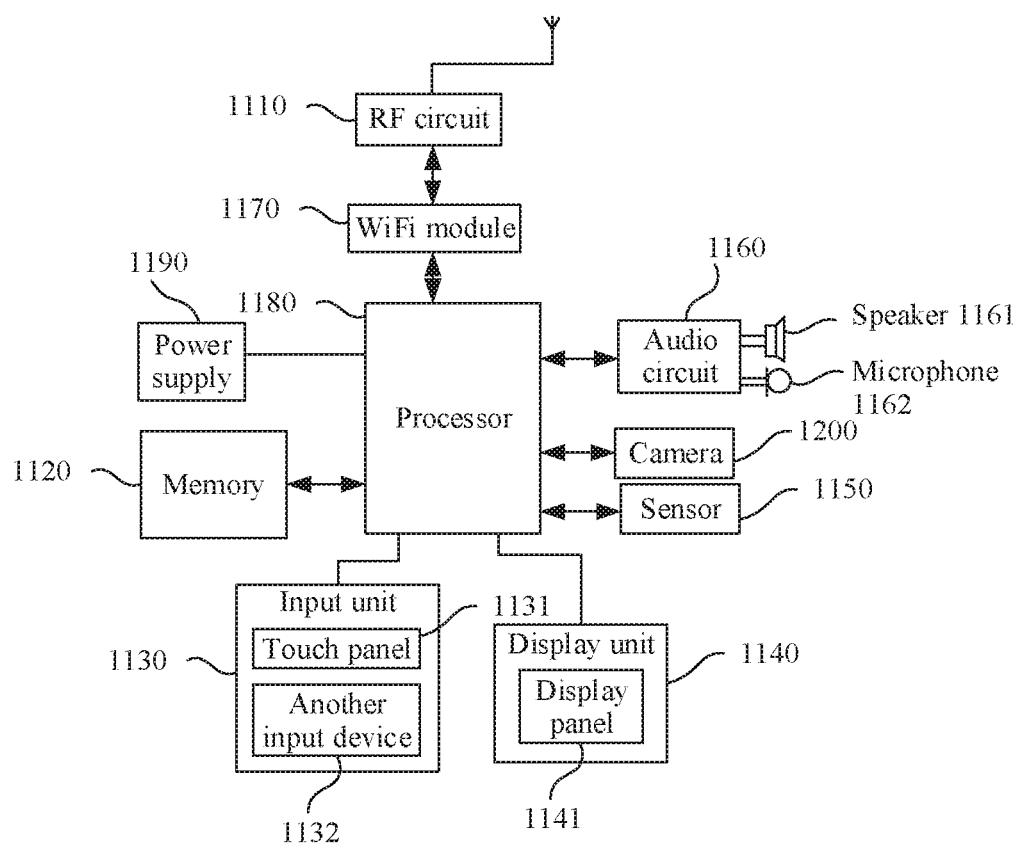
FIG. 25 is a structure block diagram of a terminal device that is a mobile phone according to this application.

As described in the foregoing embodiment, the terminal device in this application may be a wireless terminal such as a mobile phone or a tablet computer. Therefore, for example, the terminal device is a mobile phone. FIG. 25 is a structure block diagram of a terminal device that is a mobile phone according to this application. Referring to FIG. 25, the mobile phone may include components such as a radio frequency (RF) circuit 1110, a memory 1120, an input unit 1130, a display unit 1140, a sensor 1150, an audio circuit 1160, a Wireless Fidelity (WiFi) module 1170, a processor 1180, and a power supply 1190. A person skilled in the art may understand that a structure of the mobile phone shown in FIG. 25 does not constitute any limitation on the mobile phone. The mobile phone may include components more or fewer than those shown in the figure, or combine some components, or have a different component arrangement.

The following describes the components of the mobile phone in detail with reference to FIG. 25.

The RF circuit 1110 may be configured to receive and send signals in an information receiving and sending process or a call process. For example, after receiving downlink information from a base station, the RF circuit 1110 sends the downlink information to a processor 1180 for processing; and sends uplink data to the base station. Usually, the RF circuit includes but is not limited to an antenna, at least one amplifier, a transceiver, a coupler, a low noise amplifier (LNA), a duplexer, and the like. In addition, the RF circuit 1110 may further communicate with a network and another device through wireless communication. The wireless communication may use any communications standard or protocol, which includes but is not limited to global system for mobile communications (GSM), a general packet radio service (GPRS), code division multiple access (CDMA), wideband code division multiple access (WCDMA), long term evolution (LTE), an email, a short message service (SMS), and the like.

The memory 1120 may be configured to store a software program and a module. The processor 1180 performs various functional applications of the mobile phone and processes data by running the software program and the module that are stored in the memory 1120. The memory 1120 may mainly include a program storage area and a data storage area. The program storage area may store an operating system, an application program required by at least one function (such as a sound play function and an image play function), and the like, and the data storage area may store data (such as audio data and a phone book) created based on use of the mobile phone, and the like. In addition, the memory 1120 may include a high-speed random access memory, and may further include a non-volatile memory such as at least one magnetic disk storage device, a flash memory, or another volatile solid-state storage device.

The input unit 1130 may be configured to: receive entered digital or character information, and generate key signal input related to user setting and function control of the mobile phone. Specifically, the input unit 1130 may include a touch panel 1131 and another input device 1132. The touch panel 1131, also referred to as a touchscreen, can collect a touch operation performed by a user on or near the touch panel 1131 (for example, an operation performed by the user on or near the touch panel 1131 by using any proper object or accessory such as a finger or a stylus), and can drive a corresponding connection apparatus based on a preset program. Optionally, the touch panel 1131 may include two parts: a touch detection apparatus and a touch controller. The touch detection apparatus detects a touch position of the user, detects a signal generated by a touch operation, and transfers the signal to the touch controller. The touch controller receives touch information from the touch detection apparatus, converts the touch information into touch point coordinates, and then sends the touch point coordinates to the processor 1180, and can receive and execute a command sent by the processor 1180. In addition, the touch panel 1131 may be implemented by using a plurality of types, such as a resistive type, a capacitive type, an infrared type, and a surface acoustic wave. In addition to the touch panel 1131, the input unit 1130 may further include another input device 1132. Specifically, the another input device 1132 may include but is not limited to one or more of a physical keyboard, a function key (for example, a volume control key or an on/off key), a trackball, a mouse, a joystick, or the like.

The display unit 1140 may be configured to display information entered by the user or information provided for the user, and various menus of the mobile phone. The display unit 1140 may include a display panel 1141. Optionally, a form such as a liquid crystal display (LCD) or an organic light-emitting diode (OLED) may be used to configure the display panel 1141. Further, the touch panel 1131 may cover the display panel 1141. When detecting a touch operation on or near the touch panel 1131, the touch panel 1131 transfers the touch operation to the processor 1180 to determine a type of a touch event, and then the processor 1180 provides corresponding visual output on the display panel 1141 based on the type of the touch event. In FIG. 10, the touch panel 1131 and the display panel 1141 are used as two independent components to implement input and input functions of the mobile phone. However, in some embodiments, the touch panel 1131 and the display panel 1141 may be integrated to implement the input and output functions of the mobile phone.

The mobile phone may further include at least one sensor 1150 such as a light sensor, a motion sensor, and another sensor. Specifically, the light sensor may include an ambient light sensor and a proximity sensor. The ambient light sensor may adjust luminance of the display panel 1141 based on brightness of ambient light, and when the mobile phone approaches an ear, the light sensor may turn off the display panel 1141 and/or backlight. As a type of motion sensor, an acceleration sensor can detect an acceleration value in each direction (generally three axes), and detect a value and a direction of gravity when the acceleration sensor is static, and is applicable to an application for recognizing a mobile phone posture (for example, screen switching between landscape and portrait modes, a related game, and magnetometer posture calibration), a function related to vibration recognition (such as a pedometer or a knock), and the like. Other sensors such as a gyroscope, a barometer, a hygrometer, a thermometer, and an infrared sensor may be also disposed on the mobile phone. Details are not described herein.

The audio circuit 1160, a loudspeaker 1161, and a microphone 1162 may provide an audio interface between the user and the mobile phone. The audio circuit 1160 may convert received audio data into an electrical signal, and then transmit the electrical signal to the loudspeaker 1161, and the loudspeaker 1161 converts the electrical signal into a sound signal for output. In addition, the audio circuit 1160 receives the electrical signal, converts the electrical signal into audio data, and then outputs the audio data to the processor 1180 for processing. After processing the audio data, the processor 1880 sends the audio data to, for example, another mobile phone by using the RF circuit 1110, or outputs the audio data to the memory 1120 for further processing.

WiFi belongs to a short-distance wireless transmission technology. The mobile phone may help, by using the WiFi module 1170, the user receive and send an email, browse a web page, access streaming media, and the like. The WiFi module 1170 provides wireless broadband Internet access for the user. Although the WiFi module 1170 is shown in FIG. 25, it should be understood that the WiFi module 1170 is not a necessary component of the mobile phone, and may be omitted based on a requirement without changing the essence of this application.

The processor 1180 is a control center of the mobile phone, is connected to each part of the entire mobile phone by using various interfaces and lines, and by running or executing the software program and/or the module that are/is stored in the memory 1120 and by invoking data stored in the memory 1120, the processor 1180 performs various functions of the mobile phone and processes data, to perform overall monitoring on the mobile phone. Optionally, the processor 1180 may include one or more processing units. For example, an application processor and a modem processor may be integrated into the processor 1180, where the application processor mainly processes an operating system, a user interface, an application program, or the like; and the modem processor mainly processes wireless communication. It may be understood that the modem processor may not be integrated into the processor 1180.

The mobile phone further includes the power supply 1190 (such as a battery) that supplies power to each component. Optionally, the power supply may be logically connected to the processor 1180 by using a power management system, so that functions such as management of charging, discharging, and power consumption are implemented by using the power management system.

The mobile phone may further include a camera 1200. The camera may be a front-facing camera or a rear-facing camera. Although not shown, the mobile phone may further include a Bluetooth module, a GPS module, and the like. Details are not described herein.

In this application, the processor 1180 included in the mobile phone may be configured to execute the foregoing resource mapping method embodiment. An implementation principle and a technical effect of the processor 1180 are similar to those in the foregoing resource mapping method embodiment. Details are not described herein again.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. A resource mapping method, wherein the method comprises:
    generating, by a network device, control information, wherein the network device communicates with a terminal device using a transmission resource, wherein the transmission resource is divided into a control region assigned to control channels and a data region assigned to data channels, and wherein the control information comprises a first information field and a second information field,
    wherein the first information field is used to indicate at least one bandwidth region in which at least one frequency domain resource unit is located, wherein the at least one frequency domain resource unit is to be used by the network device and the terminal device to transmit a data channel, wherein the at least one frequency domain resource unit is in the control region of the transmission resource, and wherein an operating bandwidth of the terminal device comprises a plurality of bandwidth regions, and the at least one bandwidth region is one or more of the plurality of bandwidth regions,
    wherein the second information field is used to indicate at least one resource mapping mode in a first resource mapping mode set, wherein the at least one resource mapping mode indicates:
        a granularity of the at least one frequency domain resource unit, wherein the granularity of the at least one frequency domain resource unit is a granularity of a resource unit used when the network device and the terminal device transmit a control channel in the control region of the transmission resource, and
        a location of the at least one frequency domain resource unit in the at least one bandwidth region;
    sending, by the network device, the control information to the terminal device; and
    communicating, by the network device with the terminal device, the data channel in the at least one frequency domain resource unit in the control region of the transmission resource based on the control information, wherein the at least one frequency domain resource unit is determined based on the granularity of the resource unit used when the network device and the terminal device transmit the control channel in the control region of the transmission resource, and the data channel reuses an idle frequency domain resource in the control region of the transmission resource for data transmission, wherein the method further comprises:
    selecting, by the network device from a plurality of bandwidth regions, the at least one bandwidth region to be scheduled for the terminal device;
    selecting, by the network device, the granularity of the frequency domain resource unit based on a resource element groups (REG) bundling size used when resource mapping is performed on the control channel; and
    selecting, by the network device, the resource mapping mode from the first resource mapping mode set based on a frequency domain location in which an idle resource in the at least one bandwidth region is located and the granularity of the frequency domain resource unit.

2. The method according to claim 1, wherein:
    each resource mapping mode in the at least one resource mapping mode included in the first resource mapping mode set corresponds to an identifier, and
    that the second information field is used to indicate the resource mapping mode comprises: the second information field comprises an identifier corresponding to the resource mapping mode.

3. The method according to claim 1, wherein the method further comprises:
    sending, by the network device, indication information to the terminal device, wherein the indication information is used to indicate the first resource mapping mode set from a plurality of candidate resource mapping mode sets.

4. The method according to claim 3, wherein the plurality of candidate resource mapping mode sets comprise the first resource mapping mode set and a second resource mapping mode set, and resource mapping modes in the first resource mapping mode set are not all the same as resource mapping modes in the second resource mapping mode set.

5. The method according to claim 3, wherein the indication information is carried in higher layer signaling.

6. The method according to claim 3, wherein the control information further comprises a third information field, and the indication information is carried in the third information field.

7. The method according to claim 1, wherein the first information field comprises a bitmap, and the bitmap is used to indicate the at least one bandwidth region in which the at least one frequency domain resource unit is located; and
each bit in the bitmap corresponds to one bandwidth region.

8. The method according to claim 1, wherein the control region and the data region comprise distinct time domain symbols.

9. The method according to claim 1, wherein the method further comprises:
configuring, by the network device, a size of the at least one bandwidth region for the terminal device by using higher layer signaling; or
obtaining, by the network device, a predefined size of the at least one bandwidth region.

10. The method according to claim 1, wherein the first resource mapping mode set is a specific resource mapping mode configured by the network device for the terminal device, and a quantity of bits in the second information field is determined based on a quantity of first resource mapping modes in the first resource mapping mode set.

11. A resource mapping method, wherein the method comprises:
receiving, by a terminal device, control information sent by a network device, wherein the network device communicates with the terminal device using a transmission resource, wherein the transmission resource is divided into a control region assigned to control channels and a data region assigned to data channels, and wherein the control information comprises a first information field and a second information field,
wherein the first information field is used to indicate
at least one bandwidth region in which at least one frequency domain resource unit is located, wherein the at least one frequency domain resource unit is to be used by the terminal device and the network device to transmit a data channel, wherein the at least one frequency domain resource unit is in the control region of the transmission resource, and wherein an operating bandwidth of the terminal device comprises a plurality of bandwidth regions, and the at least one bandwidth region is one or more of the plurality of bandwidth regions,
wherein the second information field is used to indicate at least one resource mapping mode in a first resource mapping mode set, wherein the at least one resource mapping mode indicates:
a granularity of the at least one frequency domain resource unit, the granularity of the at least one frequency domain resource unit being a granularity of a resource unit used when the network device and the terminal device transmit a control channel in the control region of the transmission resource, and
a location of the at least one frequency domain resource unit in the at least one bandwidth region;
determining, by the terminal device, the at least one frequency domain resource unit based on the granularity of the resource unit used when the network device and the terminal device transmit the control channel in the control region of the transmission resource; and
transmitting, by the terminal device, the data channel in the at least one frequency domain resource unit in the control region of the transmission resource based on the control information, wherein the data channel reuses an idle frequency domain resource in the control region of the transmission resource for data transmission, wherein:
the at least one bandwidth region is selected from a plurality of bandwidth regions;
the granularity of the frequency domain resource unit is selected based on a resource element groups (REG) bundling size used when resource mapping is performed on the control channel; and
the resource mapping mode is selected from the first resource mapping mode set based on a frequency domain location in which an idle resource in the at least one bandwidth region is located and the granularity of the frequency domain resource unit.

12. The method according to claim 11, wherein each resource mapping mode in the at least one resource mapping mode included in the first resource mapping mode set corresponds to an identifier, and that the second information field is used to indicate the resource mapping mode comprises:
the second information field comprises an identifier corresponding to the resource mapping mode.

13. The method according to claim 11, wherein before the determining, by the terminal device, a first resource mapping mode set, the method further comprises:
receiving, by the terminal device, indication information sent by the network device, wherein the indication information is used to indicate the first resource mapping mode set from a plurality of candidate resource mapping mode sets.

14. The method according to claim 13, wherein the plurality of candidate resource mapping mode sets comprise the first resource mapping mode set and a second resource mapping mode set, and resource mapping modes in the first resource mapping mode set are not all the same as resource mapping modes in the second resource mapping mode set.

15. The method according to claim 13, wherein the indication information is carried in higher layer signaling.

16. The method according to claim 13, wherein the control information further comprises a third information field, and the indication information is carried in the third information field.

17. The method according to claim 11, wherein the first information field comprises a bitmap, and the bitmap is used to indicate the at least one bandwidth region in which the at least one frequency domain resource unit is located; and
each bit in the bitmap corresponds to one bandwidth region.

18. The method according to claim 11, wherein the control region and the data region comprise distinct time domain symbols.

* * * * *